US011890731B2

(12) United States Patent
Hozumi

(10) Patent No.: US 11,890,731 B2
(45) Date of Patent: Feb. 6, 2024

(54) POWER TOOL HAVING ILLUMINATION DEVICE

(71) Applicant: MAKITA CORPORATION, Anjo (JP)

(72) Inventor: Akihiro Hozumi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 4 days.

(21) Appl. No.: 17/663,697

(22) Filed: May 17, 2022

(65) Prior Publication Data

US 2022/0388134 A1 Dec. 8, 2022

(30) Foreign Application Priority Data

Jun. 8, 2021 (JP) ................................. 2021-095928

(51) Int. Cl.

| | |
|---|---|
| ***F21V 33/00*** | (2006.01) |
| ***B25B 23/18*** | (2006.01) |
| ***F21V 19/00*** | (2006.01) |
| ***F21V 5/04*** | (2006.01) |
| *B25B 21/02* | (2006.01) |
| *F21Y 105/18* | (2016.01) |
| *F21Y 115/10* | (2016.01) |

(52) U.S. Cl.

CPC ................ *B25B 23/18* (2013.01); *F21V 5/04* (2013.01); *F21V 19/003* (2013.01); *B25B 21/02* (2013.01); *F21Y 2105/18* (2016.08); *F21Y 2115/10* (2016.08)

(58) Field of Classification Search

CPC ........ F21V 33/0084; F21V 5/006; F21V 5/08; B25B 23/18; F21L 4/02; F21L 4/027; B25F 5/02; F21Y 2105/18; F21Y 2105/14

See application file for complete search history.

(56) References Cited

U.S. PATENT DOCUMENTS

| | | | | |
|---|---|---|---|---|
| 2,525,414 A * | 10/1950 | Kleinschmidt | B25B 23/18 | 362/120 |
| 2,773,974 A * | 12/1956 | Markett | B25B 23/18 | 362/120 |
| 5,068,652 A * | 11/1991 | Kobayashi | G06F 1/1616 | 361/679.08 |
| 6,832,725 B2 * | 12/2004 | Gardiner | G06K 7/109 | 235/462.43 |
| 7,615,734 B2 * | 11/2009 | Yoshizu | G06V 40/1312 | 250/221 |
| 8,016,048 B2 * | 9/2011 | Ueda | B25B 23/18 | 362/120 |
| 8,371,848 B2 * | 2/2013 | Okawa | A61B 1/24 | 433/29 |

(Continued)

FOREIGN PATENT DOCUMENTS

JP 5146717 B2 2/2013

*Primary Examiner* — Ismael Negron

(74) *Attorney, Agent, or Firm* — J-TEK LAW PLLC; Jeffrey D. Tekanic; Scott T. Wakeman

(57) ABSTRACT

A power tool includes a motor; an output part configured to be rotated around a rotational axis in response to energization of the motor; a plurality of lights disposed spaced apart around the output part; and an optical member having a refractive surface that refracts illumination light emitted from a light-emitting surface of one of the lights such that the main illumination direction extends at an angle away from the rotational axis.

23 Claims, 25 Drawing Sheets

(56) References Cited

U.S. PATENT DOCUMENTS

| | | | | |
|---|---|---|---|---|
| 8,496,366 | B2 * | 7/2013 | Leong | B25B 23/18<br>362/446 |
| 9,028,088 | B2 * | 5/2015 | Vanko | B25F 5/00<br>362/120 |
| 9,849,984 | B2 * | 12/2017 | Ohta | F21V 5/04 |
| 10,709,071 | B2 * | 7/2020 | Yahya | F21V 33/00 |
| 10,859,219 | B2 * | 12/2020 | Butala | F21V 21/04 |
| 11,453,106 | B2 * | 9/2022 | Kelly | B25F 5/021 |
| 2010/0038103 | A1 | 2/2010 | Ueda et al. | |

* cited by examiner

COMPARATIVE EXAMPLE

COMPARATIVE EXAMPLE

POWER TOOL HAVING ILLUMINATION DEVICE

CROSS-REFERENCE

This application claims priority to Japanese Patent Application No. 2021-095928 filed on Jun. 8, 2021, the contents of which are incorporated herein by reference.

TECHNICAL FIELD

Techniques disclosed in the present specification relate to a power tool, in particular to techniques for suitably illuminating a work object during a power tool operation.

BACKGROUND ART

US 2010/0038103 discloses a power tool comprising an LED for illuminating a work object during a power tool operation.

SUMMARY

One non-limiting object of the present disclosure is to disclose techniques for suitably illuminating a work object being worked upon by a power tool.

In one aspect of the present teachings, a power tool may comprise: a motor; an output part, which is rotated about a rotational axis by the motor, e.g., in response to energization of the motor; and a plurality of lights disposed spaced apart around the output part. The power tool may comprise an optical member having a refractive surface that refracts, radially outward of (away from) the rotational axis, illumination light emitted from a light-emitting surface of one of the lights. In other words, the optical member changes the direction of propagation (travel) of the illumination light emitted from the light-emitting surface towards a direction away from the rotational axis of the output part.

In another aspect of the present teachings, a power tool may comprise: a motor; an output part, which is rotated about a rotational axis by the motor, e.g., in response to energization of the motor; and a plurality of lights disposed spaced apart around the output part. The power tool may comprise a circuit board having a support surface that supports the lights. The power tool may comprise an optical member, which is disposed such that it opposes a light-emitting surface of one of the lights. The power tool may comprise a cover member, which is disposed more forward than at least a portion of the circuit board. The cover member may be formed of a material that differs from the material of the optical member. The cover member may be formed integrally with the optical member.

In another aspect of the present teachings, a power tool may comprise: a motor; an output part, which is rotated about a rotational axis by the motor, e.g., in response to energization of the motor; and a plurality of lights disposed spaced apart around the output part. The power tool may comprise a circuit board having a support surface that supports the lights. The power tool may comprise an optical member, which is disposed such that it opposes a light-emitting surface of one of the lights. The power tool may comprise a cover member, which has at least a portion that is disposed more forward than the support surface of the circuit board. The cover member may be formed of a material the same as the material of the optical member. The cover member may be formed integrally with the optical member. The power tool may comprise a colored layer, which is provided on at least one of a rear surface of the cover member and a front surface of the cover member.

According to all of the above-mentioned configurations, a work object being worked upon by a power tool can be suitably illuminated.

DETAILED DESCRIPTION

Figure 1:
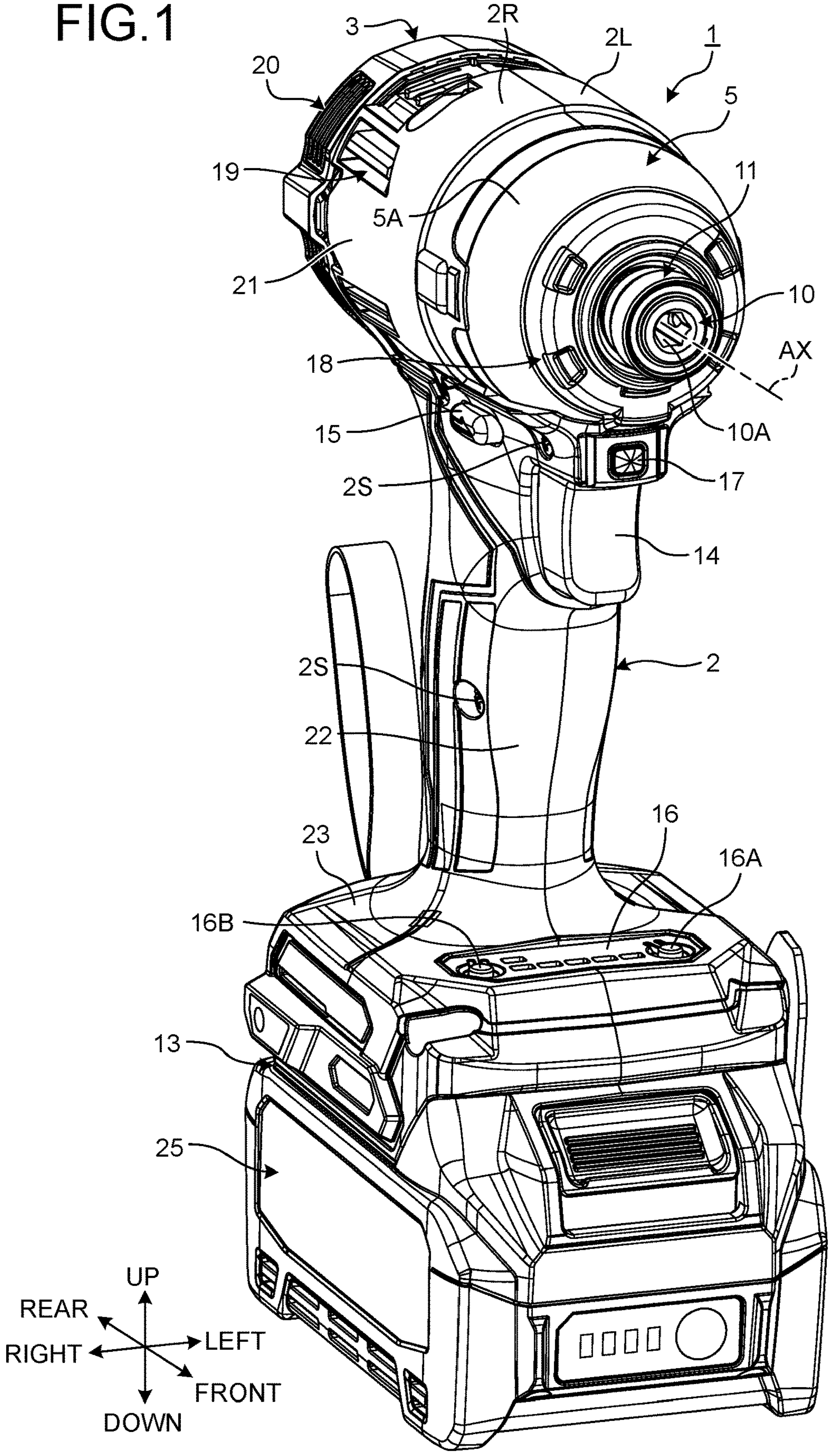
FIG. 1 is an oblique view that shows a power tool according to a first embodiment of the present teachings.

In one or more embodiments, a power tool may comprise: a motor; an output part, which is rotated about a rotational axis by the motor (e.g., via speed-reducing mechanism, a spindle, and/or a hammer-anvil mechanism, etc.), e.g., in response to energization of the motor; and a plurality of lights disposed spaced apart around the output part. The power tool may comprise an optical member having a refractive surface that refracts, radially outward of (away from) the rotational axis, illumination light emitted from a light-emitting surface of one of the lights. As was noted above, the optical member changes the direction of propagation (travel) of the illumination light (i.e. a light beam) emitted from the light-emitting surface towards a direction away from the rotational axis of the output part.

In the above-mentioned configuration, because illumination light emitted from at least one of the lights is refracted (changed in direction of propagation) by the refractive surface of the optical member, the illumination light advances (projects) along a propagation path that is more radially outward of the rotational axis than in case the optical member has no refractive power. Consequently, if two or more optical members are respectively provided for two or more of the lights, the overlapping range between the illumination light emitted from a first light and the illumination light emitted from a second light becomes small or even zero at the surface of a work object being worked on by the power tool. In addition, when a tool accessory is mounted on the output part, less or none of the illumination light emitted from the light(s) is irradiated toward the tool accessory, and therefore the tool accessory tends not cause a shadow to form on the surface of the work object when the light(s) is (are) illuminated. Thereby, the work object being worked on by the power tool can be better illuminated.

In one or more embodiments, the optical member(s) may (each) have an incident surface, on which illumination light emitted from the one of the lights impinges, and an emergent surface, from which the illumination light emerges. The incident surface may include the refractive surface; i.e. the incident surface and the refractive surface may be coplanar.

In the above-mentioned configuration, the incident surface, which includes the refractive surface, is not exposed as an exterior surface of the power tool. Accordingly, the likelihood of damage to the refractive surface during usage or storage of the power tool can be reduced.

In one or more embodiments, the incident surface may oppose (face) the light-emitting surface.

In the above-mentioned configuration, because it is not necessary to dispose separate (discrete) optical member between the light-emitting surface of the one of the lights and the incident surface of the optical member, the size of the power tool does not increase and the structure of the optical system through which the illumination light emitted from the light(s) passes is not made more complex.

In one or more embodiments, the refractive surface may be tilted such that the refractive surface approaches the respective light as the refractive surface extends radially outward. In other words, the refractive surface is preferably inclined such that, with respect to the rotational axis of the output part, the refractive surface is closer to a radially outer side of the respective light than to a radially inner side of the respective light.

In the above-mentioned configuration, illumination light emitted from the light-emitting surface of the one of the lights can be refracted radially outward of (away from) the rotational axis at (by) the refractive surface.

In one or more embodiments, the refractive surface may include a first refractive surface, which refracts illumination light in a first direction, and a second refractive surface, which refracts illumination light in a second direction that differs from the first direction. The first and second refractive surfaces are also both preferably flat and connected each other at a vertex. The first and second refractive surfaces preferably form an angle of, e.g., at least 90°, or at least 100° or at least 115° or at least 120°, and less than or equal to 170°, less than or equal to 150°, less than or equal to 135°, or less than or equal to 130°. Ranges for the angle formed by the first and second refractive surfaces may be derived from any of the above-noted lower or upper limits of the angle, e.g., 115-135°.

In the above-mentioned configuration, because illumination light emitted from the light-emitting surface of the one of the lights is refracted in a plurality of (different) directions, the illumination range of the illumination light at (on) the surface of the work object being worked on by the power tool is enlarged (spreads).

In one or more embodiments, the power tool may comprise a circuit board having a support surface that supports the lights.

In the above-mentioned configuration, in the state in which the lights are supported by the support surface of the circuit board, the lights can emit illumination light.

In one or more embodiments, the rotational axis and a normal line of the light-emitting surface may be parallel to one another.

In the above-mentioned configuration, after the illumination light emitted from the light-emitting surface of the one of the lights has advanced (propagated) parallel to the rotational axis, it can be refracted radially outward of (away from) the rotational axis by the respective optical member.

In one or more embodiments, the optical member(s) may be fixed to the circuit board.

In the above-mentioned configuration, because the optical member is fixed to the circuit board, the relative positions of the lights, the optical member(s), and the circuit board do not change during operation of the power tool.

In one or more embodiments, the power tool may comprise a cover member, which has at least a portion that is disposed more forward than the circuit board, is formed of a material that differs from the material of the optical member(s), and is formed integrally with the optical member(s).

In the above-mentioned configuration, the circuit board is protected by the cover member. By protecting the circuit board, the lights can operate suitably and the lighting arrangement can be made more durable. Accordingly, the work object being worked on by the power tool is suitably illuminated in a durable manner.

In one or more embodiments, a power tool may comprise: a motor; an output part, which is rotated about a rotational axis by the motor (e.g., via speed-reducing mechanism, a spindle, a hammer-anvil mechanism, etc.), e.g., by energization of the motor; and a plurality of lights disposed spaced apart around the output part. The power tool may comprise a circuit board having a support surface that supports the lights. The power tool may comprise an optical member, which is disposed such that it opposes (faces) a light-emitting surface of one of the lights. The power tool may comprise a cover member, which has at least a portion that is disposed more forward than the circuit board. The cover member may be formed of a material that differs from the material of the optical member. The cover member may be formed integrally with the optical member.

In the above-mentioned configuration, at least one of the lights is protected by the optical member, and the circuit board is protected by the cover member. By protecting the light(s), the likelihood of damage to the light(s) can be reduced. By protecting the circuit board, the lights can operate suitably. Because the cover member is formed of a material that differs from the material of the optical member, the circuit board is suitably protected. In addition, because the optical member and the cover member are formed integrally, the relative positions of the optical member and the cover member do not change during operation. Accordingly, the work object being worked on by the power tool can be suitably illuminated in a durable manner.

In one or more embodiments, the optical member and the cover member are fixed to the circuit board.

In the above-mentioned configuration, because the optical member and the cover member are each fixed to the circuit board, the relative positions of the lights, the optical member, and the circuit board do not change during operation.

In one or more embodiments, the optical member may include an optically transmissive part, which transmits illumination light emitted from the light-emitting surface. The cover member may comprise a light-shielding part.

In the above-mentioned configuration, the illumination light emitted from the light-emitting surface of at least one of the lights transmits through the optically transmissive part and is irradiated toward the work object being worked on by the power tool. Because the circuit board is not visible from outside of the cover member owing to the light-shielding part, the aesthetics of the power tool are improved. In addition, irradiation of external light onto the circuit board can be blocked.

In one or more embodiments, the optical member may be formed of a synthetic resin (polymer). The cover member may be formed of a synthetic resin (polymer) in which a coloring material (e.g., a dye or other type of pigment) is dispersed.

In the above-mentioned configuration, the optical member is formed of a synthetic resin (polymer) that is optically transmissive. The cover member is formed by dispersing the coloring material in the synthetic resin (polymer) that also constitutes the optical member, which does not contain the coloring material. In other words, the cover member and the optical member optionally may be formed from the same polymer base material, and thus differ only in that the cover member contains a coloring material (which preferably makes the cover member opaque), whereas the optical member does not contain the coloring material, thereby preferably remaining transmissive (e.g., clear) and also optionally colorless.

In one or more embodiments, a power tool may comprise: a motor; an output part, which is rotates about a rotational axis by the motor (e.g., via speed-reducing mechanism, a spindle, a hammer-anvil mechanism, etc.), e.g., in response to energization of the motor; and a plurality of lights disposed spaced apart around the output part. The power tool may comprise a circuit board having a support surface that supports the lights. The power tool may comprise an optical member, which is disposed such that it opposes a light-emitting surface of one of the lights. The power tool may comprise a cover member, which has at least a portion that is disposed more forward than the support surface of the circuit board. The cover member and the optical member may be formed of the same material, e.g., the same polymer (synthetic resin) base. The cover member may be formed integrally with the optical member. The power tool may comprise a colored layer, which is provided on at least one of a rear surface of the cover member and a front surface of the cover member.

In the above-mentioned configuration, at least one of the lights is protected by the optical member, and the circuit board is protected by the cover member. By protecting the lights, the likelihood of damage to the light(s) can be reduced. By protecting the circuit board, the lights can operate suitably. In addition, because the optical member and the cover member are formed integrally, the relative positions of the optical member and the cover member do not change during operation. Accordingly, the work object being worked on by the power tool is suitably illuminated. In addition, because the circuit board is not visible from outside of the cover member owing to the colored layer, which is provided on at least one of the rear surface of the cover member and the front surface of the cover member, the aesthetics of the power tool are improved. In addition, irradiation of external light onto the circuit board can be blocked.

In one or more embodiments, the power tool may comprise a bonding layer, which is disposed between the cover member and the colored layer.

In the above-mentioned configuration, the cover member and the colored layer are fixed to one another via the bonding layer.

In one or more embodiments, the power tool may comprise a protective layer, which covers the colored layer.

In the above-mentioned configuration, the colored layer is protected by the protective layer. Owing to the protective layer, for example, the colored layer is less likely to peel off from the bonding layer or the cover member.

In one or more embodiments, the power tool may comprise: a transmission mechanism (e.g., a speed-reducing mechanism, a spindle and/or a hammer-anvil mechanism), which transmits rotational force of the motor to the output part; and a case, which houses the transmission mechanism and at least a portion of the output part. The optical member and the cover member may be supported by (in) the case.

In the above-mentioned configuration, the relative positions of the optical member and the cover member on one side and the case on the other side do not change during operation of the power tool.

In one or more embodiments, the case may comprise a first tube part, which is disposed around the transmission mechanism, and a second tube part, which is disposed more forward than the first tube part and whose outer diameter is smaller than the outer diameter of the first tube part. The optical member and the cover member may be disposed around the second tube part.

In the above-mentioned configuration, because the optical member and the cover member are disposed around the second tube part, which has a small diameter, the size of the power tool is not increased. In particular, the first tube part need not be enlarged (increased in the diameter) to accommodate the lighting unit of the present teachings. Because the first tube part need not be enlarged (increased in the diameter), work efficiency using the power tool can be increased.

In one or more embodiments: the second tube part may comprise angled parts, which protrude radially outward; and the optical member and the cover member may have recessed parts, in which the angled parts are disposed.

In the above-mentioned configuration, the optical member and the cover member on one side and the second tube part on the other side can be properly aligned with one another. In addition, relative rotation between the optical member and the cover member on one side and the second tube part on the other side is restricted (blocked).

In one or more embodiments, the power tool may comprise a fixing member, which is supported by the second tube part and makes contact with at least a portion of the front surface of the cover member.

In the above-mentioned configuration, the fixing member can prevent the cover member from coming off forward from the second tube part. In addition, relative movement between the cover member and the second tube part in the front-rear direction is restricted (blocked).

First Embodiment

A first embodiment of the present disclosure will now be explained, with reference to the drawings. In the first embodiment, the positional relationships among the various parts are explained using the terms left, right, front, rear, up, and down. These terms indicate relative positions or directions, with reference to the center of a power tool 1. The power tool 1 comprises a motor 6, which serves as the power source.

In the embodiment, the direction parallel to a rotational axis AX of the motor 6 is called the axial direction where appropriate, the direction that goes around rotational axis AX is called the circumferential direction or the rotational direction where appropriate, and the radial direction of rotational axis AX is called the radial direction where appropriate.

Rotational axis AX extends in the front-rear direction. One side in the axial direction is forward, and the other side in the axial direction is rearward. In addition, in the radial direction, the direction that is located close to or that approaches rotational axis AX is called "radially inward" or "inward in a (the) radial direction" where appropriate, and the direction that is located distant from or leads away from rotational axis AX is called "radially outward" or "outward in a (the) radial direction" where appropriate. In addition, in the circumferential direction, the prescribed forward-rotational direction is called one side in the circumferential direction where appropriate, and the reverse-rotational direction is called the other side in the circumferential direction where appropriate.

Power Tool

Figure 2:
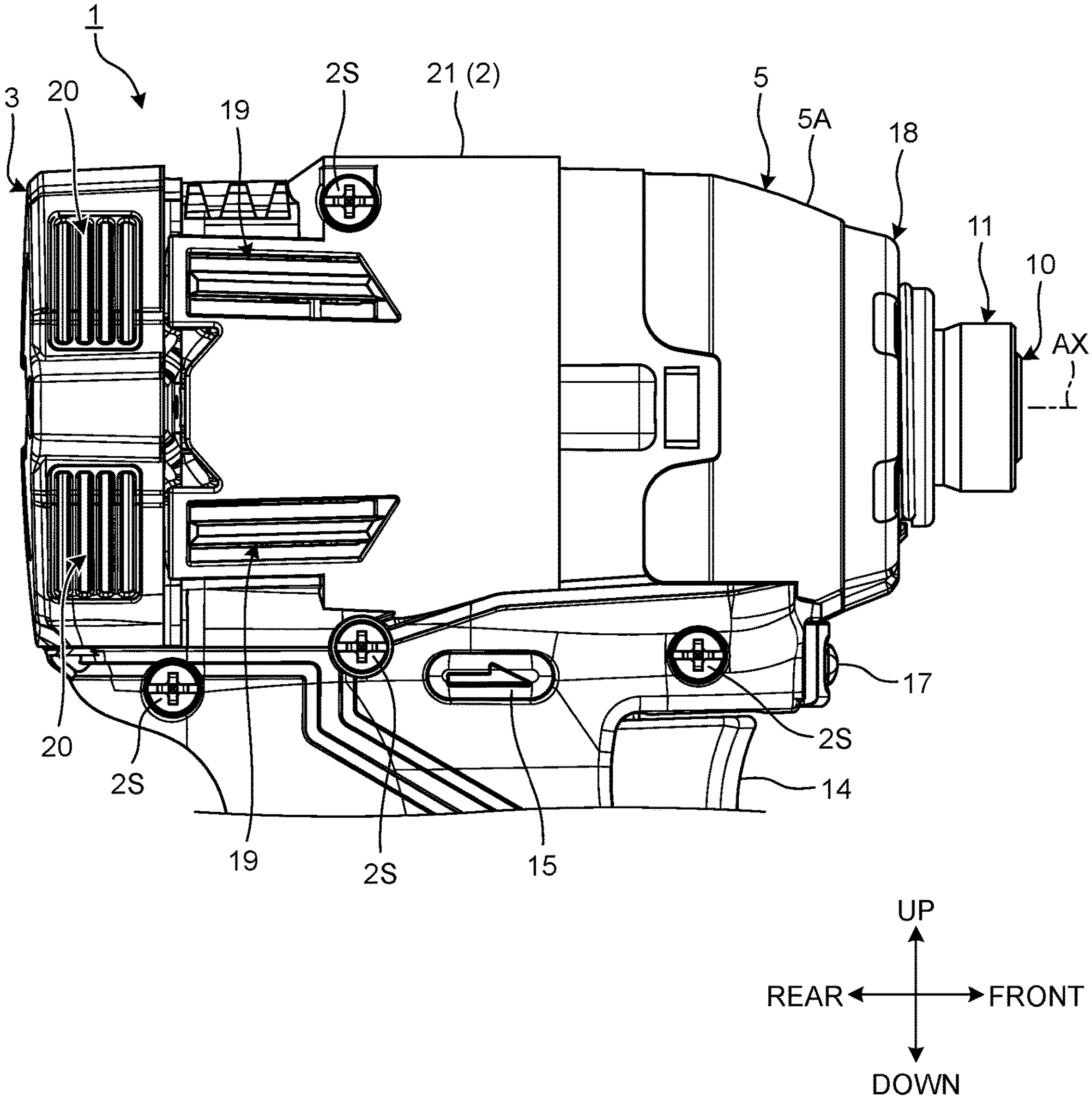
FIG. 2 is a side view that shows an upper portion of the power tool according to the first embodiment.
Figure 3:
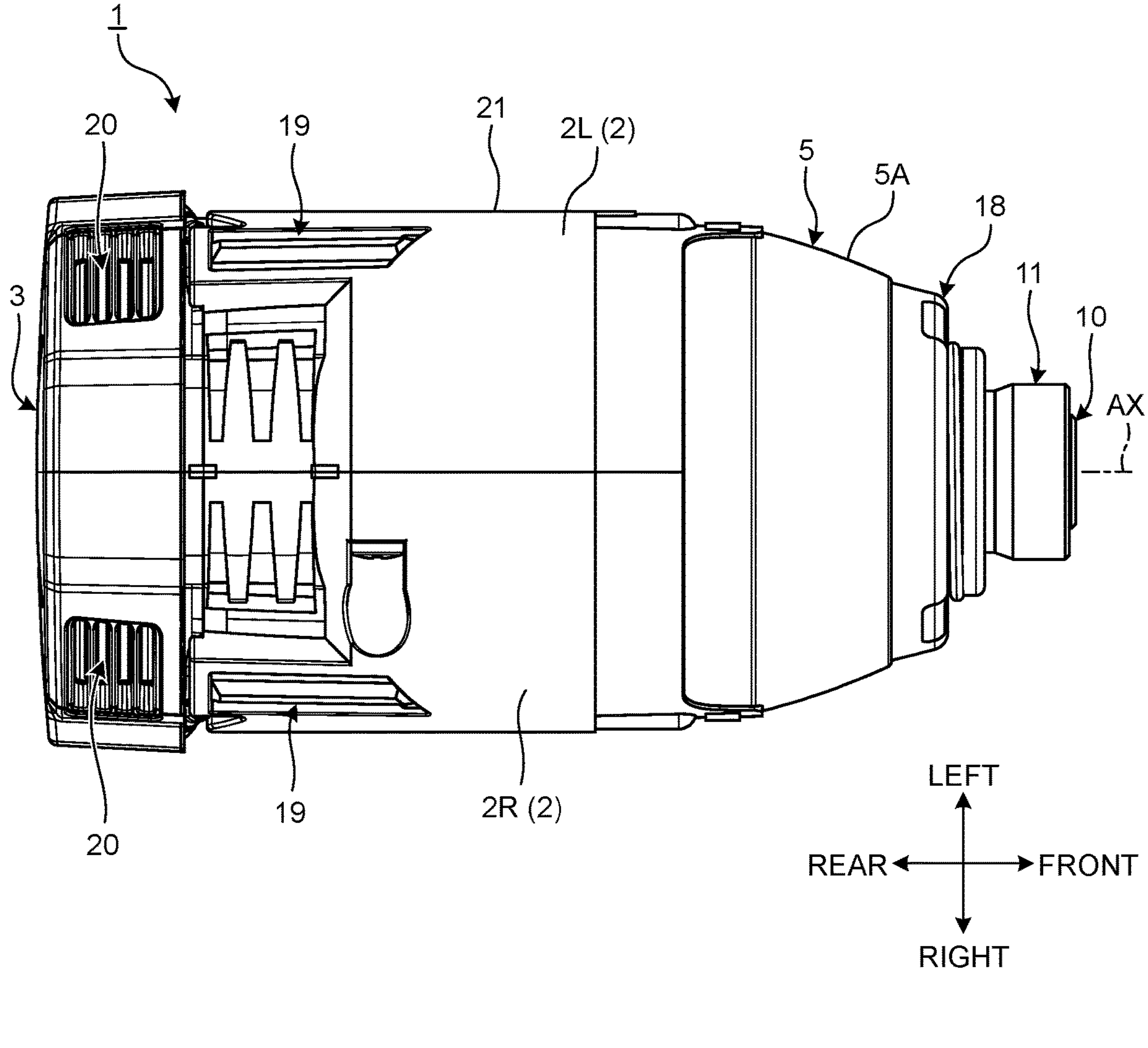
FIG. 3 is a plan view that shows the upper portion of the power tool according to the first embodiment.
Figure 4:
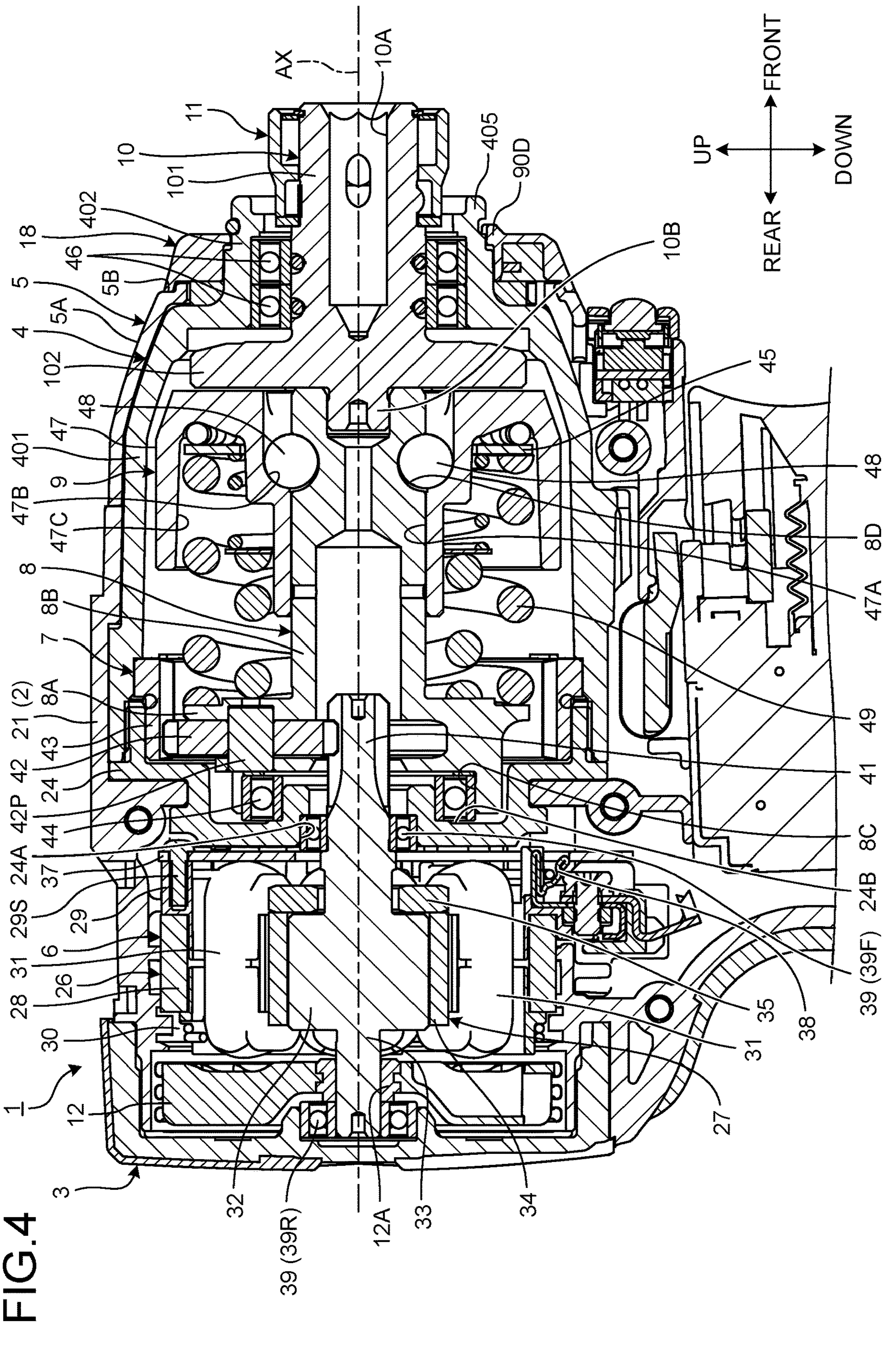
FIG. 4 is a cross-sectional view that shows the upper portion of the power tool according to the first embodiment.

FIG. 1 is an oblique view that shows the power tool 1 according to the first representative, non-limiting embodiment of the present teachings. FIG. 2 is a side view that shows an upper portion of the power tool 1. FIG. 3 is a plan view that shows the upper portion of the power tool 1. FIG. 4 is a cross-sectional view that shows the upper portion of the power tool 1.

In the first embodiment, the power tool 1 is an impact driver, which is one type of screw-tightening tool. The power tool 1 comprises a housing 2, a rear cover 3, a hammer case 4, a hammer-case cover 5, the motor 6, a speed-reducing mechanism 7, a spindle 8, an impact (hammer) mechanism 9, an anvil 10, a bit sleeve 11, a fan 12, a battery-mounting part 13, a trigger switch 14, a forward/reverse change lever (reversing lever or reversing switch lever) 15, an operation panel 16, a quick mode-switching button 17, and a light unit 18.

The housing 2 is made of a synthetic resin (polymer). In the first embodiment, the housing 2 is made of a nylon (polyamide). The housing 2 comprises a left housing 2L and a right housing 2R, which is disposed rightward of the left housing 2L. The left housing 2L and the right housing 2R are fixed to one another by a plurality of screws 2S. The housing 2 comprises a pair of half housings.

The housing 2 comprises a motor-housing part 21, a grip part 22, and a battery-connect part 23.

The motor-housing part 21 has a tube shape. The motor-housing part 21 houses the motor 6.

The grip part 22 protrudes downward from the motor-housing part 21. The trigger switch 14 is provided at an upper portion of the grip part 22. The grip part 22 is gripped by a user.

The battery-connect part 23 is connected to a lower-end portion of the grip part 22. In both the front-rear direction and the left-right direction, the dimension of the outer shape of the battery-connect part 23 is larger than the dimension of the outer shape of the grip part 22.

The rear cover 3 is made of a synthetic resin (polymer), e.g., a nylon (polyamide). The rear cover 3 is disposed rearward of the motor-housing part 21. The rear cover 3 houses at least a portion of the fan 12. The fan 12 is disposed on the inner-circumference side of the rear cover 3. The rear cover 3 is disposed such that it covers an opening at a rear-end portion of the motor-housing part 21.

The motor-housing part 21 has air-intake ports 19. The rear cover 3 has air-exhaust ports 20. Air from outside of the housing 2 flows into the interior space of the housing 2 via the air-intake ports 19. Air from the interior space of the housing 2 flows out to the outside of the housing 2 via the air-exhaust ports 20.

The hammer case 4 is made of a metal. In the first embodiment, the hammer case 4 is made of aluminum. The hammer case 4 has a tube shape. The hammer case 4 is connected to a front portion of the motor-housing part 21. A bearing box 24 is held by and fixed to a rear portion of the hammer case 4. A screw thread is formed on an outer-circumferential portion of the bearing box 24. A thread groove is formed on an inner-circumferential portion of the hammer case 4. By joining (threadably engaging) the screw thread of the bearing box 24 and the thread groove of the hammer case 4, the bearing box 24 and the hammer case 4 are fixed to one another. The hammer case 4 is sandwiched between the left housing 2L and the right housing 2R. A portion of the bearing box 24 and a rear portion of the hammer case 4 are housed in the motor-housing part 21. The bearing box 24 is fixed to the motor-housing part 21 and the hammer case 4.

The hammer case 4 houses the speed-reducing mechanism 7, the spindle 8, the impact mechanism 9, and at least a portion of the anvil 10. At least a portion of the speed-reducing mechanism 7 is disposed on the inner side of the bearing box 24. The speed-reducing mechanism 7 comprises a plurality of gears, as will be further explained below.

The hammer-case cover 5 covers at least a portion of the surface of the hammer case 4. The hammer-case cover 5 is made of a synthetic resin (polymer). In the first embodiment, the hammer-case cover 5 is made of a polycarbonate. The hammer-case cover 5 protects the hammer case 4. The hammer-case cover 5 blocks (shields) contact between the hammer case 4 and objects around the power tool 1. The hammer-case cover 5 also blocks (shields) contact between the hammer case 4 and the user.

The motor 6 is the power source of the power tool 1. The motor 6 is an inner-rotor-type brushless motor. The motor 6 comprises a stator 26 and a rotor 27. The stator 26 is supported by and fixed to the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The stator 26 comprises a stator core 28, a front insulator 29, a rear insulator 30, and coils 31.

The stator core 28 is disposed radially outward of the rotor 27. The stator core 28 comprises a plurality of laminated steel sheets. The steel sheets are made of a metal alloy whose main component is iron. The stator core 28 has a tube shape. The stator core 28 comprises teeth which respectively support the coils 31.

The front insulator 29 is provided at a front portion of the stator core 28. The rear insulator 30 is provided at a rear portion of the stator core 28. The front insulator 29 and the rear insulator 30 each are an electrically insulating member made of a synthetic resin (polymer). The front insulator 29 is disposed such that it covers some of the teeth surfaces. The rear insulator 30 is disposed such that it covers some of the teeth surfaces.

The coils 31 are mounted on the stator core 28 via the front insulator 29 and the rear insulator 30. A plurality of the coils 31 is disposed. The coils 31 are disposed via the front insulator 29 and the rear insulator 30 and around the teeth of the stator core 28. The coils 31 and the stator core 28 are electrically insulated from one another by the front insulator 29 and the rear insulator 30. In order to supply electric power (current) from a battery pack 25, the coils 31 are connected to lead wires via fusing terminals 38.

The rotor 27 rotates around rotational axis AX. The rotor 27 comprises a rotor core 32, a rotor shaft 33, at least one rotor magnet 34, and at least one sensor magnet 35.

The rotor core 32 and the rotor shaft 33 each are made of steel. A front portion of the rotor shaft 33 protrudes forward from a front-end surface of the rotor core 32. A rear portion of the rotor shaft 33 protrudes rearward from a rear-end surface of the rotor core 32.

The rotor magnet 34 is fixed to the rotor core 32. The rotor magnet 34 has a circular-tube shape. The rotor magnet 34 is disposed around the rotor core 32.

The sensor magnet 35 is fixed to the rotor core 32. The sensor magnet 35 has a circular-ring shape. The sensor magnet 35 is disposed at the front-end surface of the rotor core 32 and the front-end surface of the rotor magnet 34.

A sensor board 37 is mounted on the front insulator 29. The sensor board 37 is fixed to the front insulator 29 by at least one screw 29S. The sensor board 37 comprises: a circuit board, which has a disk shape and in which a hole is provided at the center; and at least one rotation-detection device, which is supported by the circuit board. At least a portion of the sensor board 37 opposes the sensor magnet 35. The rotation-detection device detects the position of the rotor 27 in the rotational direction by detecting the position of the sensor magnet 35 of the rotor 27.

The rotor shaft 33 is supported in a rotatable manner by rotor bearings 39. The rotor bearings 39 comprise: a front-side rotor bearing 39F, which supports a front portion of the rotor shaft 33 in a rotatable manner; and a rear-side rotor bearing 39R, which supports a rear portion of the rotor shaft 33 in a rotatable manner.

The front-side rotor bearing 39F is held by the bearing box 24. The bearing box 24 has a recessed part 24A, which is recessed forward from a rear surface of the bearing box 24. The front-side rotor bearing 39F is disposed in the recessed part 24A. The rear-side rotor bearing 39R is held by the rear cover 3. A front-end portion of the rotor shaft 33 is disposed in the interior space of the hammer case 4 through an opening in the bearing box 24.

A pinion gear 41 is formed at a front-end portion of the rotor shaft 33. The pinion gear 41 is coupled to at least a portion of the speed-reducing mechanism 7. The rotor shaft 33 is coupled to the speed-reducing mechanism 7 via the pinion gear 41.

The speed-reducing mechanism 7 is disposed forward of the motor 6. The speed-reducing mechanism 7 couples the rotor shaft 33 and the spindle 8. The speed-reducing mechanism 7 transmits the rotational force of the motor 6 to the spindle 8. The speed-reducing mechanism 7 causes the spindle 8 to rotate at a rotational speed that is lower than the rotational speed of the rotor shaft 33. The speed-reducing mechanism 7 comprises a planetary-gear mechanism.

The speed-reducing mechanism 7 comprises a plurality of gears. The gears of the speed-reducing mechanism 7 are driven by the rotor 27.

The speed-reducing mechanism 7 comprises a plurality of planet gears 42, which are disposed around the pinion gear 41, and an internal gear 43, which is disposed around the plurality of planet gears 42. The pinion gear 41, the planet gears 42, and the internal gear 43 are each housed in the hammer case 4 and the bearing box 24. Each of the planet gears 42 meshes with the pinion gear 41. The planet gears 42 are supported in a rotatable manner on the spindle 8 via respective pins 42P. The spindle 8 is rotated by the planet gears 42. The internal gear 43 has radially-inward facing teeth, which mesh with the radially-outward facing teeth of the planet gears 42. The internal gear 43 is fixed to the bearing box 24. The internal gear 43 is always non-rotatable relative to the bearing box 24.

When the rotor shaft 33 rotates in response to the operation (energization) of the motor 6, the pinion gear 41 rotates, and the planet gears 42 revolve around the pinion gear 41. The planet gears 42 revolve (orbit) around the pinion gear 41 while meshing with the radially-inward facing teeth of the internal gear 43. Owing to the revolving of the planet gears 42, the spindle 8, which is connected to the planet gears 42 via the pins 42P, rotates at a rotational speed that is lower than the rotational speed of the rotor shaft 33.

The spindle 8 is disposed more forward than at least a portion of the motor 6. The spindle 8 is disposed forward of the stator 26. At least a portion of the spindle 8 is disposed forward of the rotor 27. At least a portion of the spindle 8 is disposed forward of the speed-reducing mechanism 7. The spindle 8 is rotated by the rotor 27. The spindle 8 is rotated by the rotational force of the motor 6 transmitted by the speed-reducing mechanism 7.

The spindle 8 comprises a flange part 8A and a spindle-shaft part 8B, which protrudes forward from the flange part 8A. The planet gears 42 are supported in a rotatable manner by the flange part 8A via the pins 42P that extend rearward from the flange part 8A. The rotational axis of the spindle 8 and rotational axis AX of the motor 6 coincide with one another. The spindle 8 rotates about rotational axis AX. The spindle 8 is supported in a rotatable manner by a spindle bearing 44. A circumferential-wall part 8C is provided at a rear-end portion of the spindle 8. The circumferential-wall part 8C surrounds the spindle bearing 44. The spindle bearing 44 supports the circumferential-wall part 8C.

The bearing box 24 is disposed at least partially around the spindle 8. The spindle bearing 44 is held by the bearing box 24. The bearing box 24 has a recessed part 24B, which is recessed rearward from a front surface of the bearing box 24. The spindle bearing 44 is disposed in the recessed part 24B.

The impact mechanism 9 is driven by the motor 6. The rotational force of the motor 6 is transmitted to the impact mechanism 9 via the speed-reducing mechanism 7 and the spindle 8. The impact mechanism 9 impacts the anvil 10 in the rotational direction owing to the rotational force of the spindle 8, which is rotated by the motor 6. The impact mechanism 9 comprises a hammer 47, balls 48, and a coil spring 49. The impact mechanism 9, which comprises the hammer 47, is housed in the hammer case 4.

The hammer 47 is disposed more forward than the speed-reducing mechanism 7. The hammer 47 is disposed around the spindle 8. The hammer 47 is held by the spindle 8. The balls 48 are disposed between the spindle 8 and the hammer 47. The coil spring 49 is supported by the spindle 8 and the hammer 47.

The hammer 47 has a tube shape. The hammer 47 is disposed around the spindle-shaft part 8B. The hammer 47 has a hole 47A, in which the spindle-shaft part 8B is disposed.

The hammer 47 is rotated by the motor 6. The rotational force of the motor 6 is transmitted to the hammer 47 via the speed-reducing mechanism 7 and the spindle 8. The hammer 47 is rotatable together with the spindle 8 owing to the rotational force of the spindle 8, which is rotated by the motor 6. The rotational axis of the hammer 47, the rotational axis of the spindle 8, and rotational axis AX of the motor 6 coincide with one another. The hammer 47 rotates around rotational axis AX.

The balls 48 are made of a metal such as steel. The balls 48 are disposed between the spindle-shaft part 8B and the hammer 47. The spindle 8 has a spindle groove 8D, in which at least some of the balls 48 are disposed. The spindle groove 8D is provided on a portion of an outer surface of the spindle-shaft part 8B. The hammer 47 has a hammer groove 47B, in which at least some of the balls 48 are disposed. The hammer groove 47B is provided on a portion of an inner surface of the hammer 47. The balls 48 are disposed between the spindle groove 8D and the hammer groove 47B. The balls 48 can roll along the inner side of the spindle groove 8D and the inner side of the hammer groove 47B. The hammer 47 is movable as the balls 48 roll. The spindle 8 and the hammer 47 can move relative to one another in the axial direction and the rotational direction within movable ranges defined by the spindle groove 8D and the hammer groove 47B.

The coil spring 49 generates an elastic (spring) force, which causes the hammer 47 to move forward. The coil spring 49 is disposed between the flange part 8A and the hammer 47. A recessed part 47C, which has a ring shape, is provided on a rear surface of the hammer 47. The recessed part 47C is recessed forward from the rear surface of the hammer 47. A washer 45 is provided on the inner side of the recessed part 47C. A rear-end portion of the coil spring 49 is supported by the flange part 8A. A front-end portion of the coil spring 49 is disposed on the inner side of the recessed part 47C and is supported by the washer 45. The coil spring 49 is preferably a compression spring.

The anvil 10 is the output part of the power tool 1, which is rotated by the motor 6. The rotational force of the motor 6 is transmitted to the anvil 10 via the speed-reducing mechanism 7 and the spindle 8. The speed-reducing mechanism 7 and the spindle 8 function as a transmission mechanism that transmits the rotational force of the motor 6 to the anvil 10.

The anvil 10 is supported in a rotatable manner by bearings 46. The rotational axis of the anvil 10, the rotational axis of the hammer 47, the rotational axis of the spindle 8, and rotational axis AX of the motor 6 coincide with one another. The anvil 10 rotates around rotational axis AX owing to the motor 6. The bearings 46 are supported by the hammer case 4. In the embodiment, two of the bearings 46 are disposed in the front-rear direction. Ball bearings are illustrative examples of the bearings 46.

At least a portion of the anvil 10 is disposed forward of the hammer 47. The anvil 10 has a tool (bit) hole 10A, into which the tool accessory is inserted. The tool hole 10A is provided in a front-end portion of the anvil 10. The tool accessory, e.g., a bit, is mounted in (on) the anvil 10. In addition, the anvil 10 comprises a spindle-protrusion part 10B, which is connected to a front-end portion of the spindle-shaft part 8B. The spindle-protrusion part 10B is provided at a rear-end portion of the anvil 10. The spindle-protrusion part 10B is inserted into a recessed part provided on the front-end portion of the spindle-shaft part 8B.

The anvil 10 comprises an anvil body 101, which has a rod shape, and an anvil-projection part 102. The tool hole 10A is provided in a front-end portion of the anvil body 101. The tool accessory is mounted in (on) the anvil body 101. The anvil-projection part 102 is provided at a rear-end portion of the anvil 10. The anvil-projection part 102 projects radially outward from a rear-end portion of the anvil body 101.

At least a portion of the hammer 47 is capable of making contact with the anvil-projection part 102. A hammer-projection part, which protrudes forward, is provided on (at) a front portion of the hammer 47. The hammer-projection part of the hammer 47 and the anvil-projection part 102 are capable of making contact with one another. In the state in which the hammer 47 and the anvil-projection part 102 are in contact with one another, the anvil 10 rotates together with the hammer 47 and the spindle 8 while the motor 6 is being energized (supplied with current).

The anvil 10 is impactable (strikable) in the rotational direction by the hammer 47. For example, during screw-tightening work, there are situations in which, when the load that acts on the anvil 10 becomes high, the anvil 10 can no longer be caused to rotate merely by the rotational force generated by the motor 6. When the anvil 10 can no longer be caused to rotate merely by the rotational force generated by the motor 6, the rotation of the anvil 10 and the hammer 47 will (temporarily) stop. As a result, the spindle 8 and the hammer 47 will move relative to one another in the axial direction and the circumferential direction via the balls 48. That is, even if the rotation of the hammer 47 (temporarily) stops, the rotation of the spindle 8 continues owing to the rotational force generated by the motor 6. In the state in which the rotation of the hammer 47 has stopped, when the spindle 8 rotates relative to the hammer 47, the balls 48 move rearward while being guided by the spindle groove 8D and the hammer groove 47B. The hammer 47 receives a force from the balls 48 and moves rearward along with the balls 48. That is, in the state in which the rotation of the anvil 10 is stopped, the hammer 47 moves rearward in response to the relative rotation of the spindle 8. The contact between the hammer 47 and the anvil-projection part 102 is released by the movement of the hammer 47 rearward.

The coil spring 49 generates an elastic (spring) force, which causes the hammer 47 to move forward. The hammer 47, which had previously moved rearward, now moves forward owing to the elastic force of the coil spring 49. When the hammer 47 moves forward, it receives a force in the rotational direction from the balls 48. That is, the hammer 47 moves forward while rotating. When the hammer 47 moves forward while rotating, the hammer 47 makes contact with the anvil-projection part 102 while rotating. Thereby, the anvil-projection part 102 is impacted in the rotational direction by the hammer 47. Both the rotational force of the motor 6 and the inertial force of the hammer 47 act on the anvil 10. Accordingly, the anvil 10 can be rotated around rotational axis AX with higher torque.

The bit sleeve 11 is disposed around a front portion of the anvil 10. The bit sleeve 11 holds the tool accessory, which is inserted into the tool hole 10A.

The fan 12 is disposed rearward of the stator 26 of the motor 6. The fan 12 generates an airflow for cooling the motor 6 and may be, e.g., a centrifugal fan, an impeller, etc. The fan 12 is fixed to at least a portion of the rotor 27 so as to rotate together with the rotor 27. The fan 12 is fixed to a rear portion of the rotor shaft 33 via a bushing 12A. The fan 12 is disposed between the rear-side rotor bearing 39R and the stator 26. The fan 12 rotates when the rotor 27 rotates. Owing to the rotation of the rotor shaft 33, the fan 12 rotates together with the rotor shaft 33. Owing to the rotation of the fan 12, air from outside of the housing 2 flows into the interior space of the housing 2 via the air-intake ports 19. The air that has flowed into the interior space of the housing 2 flows through the interior space of the housing 2, thereby cooling the motor 6. The air that has flowed through the interior space of the housing 2 flows out to the outside of the housing 2 via the air-exhaust ports 20 while the fan 12 is rotating.

The battery-mounting part 13 is disposed at a lower portion of the battery-connect part 23. The battery-mounting part 13 is connected to the battery pack 25. The battery pack 25 is mounted on the battery-mounting part 13. The battery pack 25 is detachable from the battery-mounting part 13. The battery pack 25 includes one or more secondary batteries. In the embodiment, the battery pack 25 includes one or more rechargeable lithium-ion batteries. After being mounted on the battery-mounting part 13, the battery pack 25 can supply electric power (current) to the power tool 1. The motor 6 is energized using the electric power (current) supplied from the battery pack 25.

The trigger switch 14 is provided on the grip part 22. The trigger switch 14 is manipulated (pressed, squeezed) by the user to start the motor 6. The motor 6 is changed between operation and stoppage by manipulating the trigger switch 14.

The forward/reverse change lever 15 is provided at an upper portion of the grip part 22. The forward/reverse change lever 15 is manipulated (pressed) by the user. By manipulating the forward/reverse change lever 15, the rotational direction of the motor 6 is changed from one of the forward-rotational direction and the reverse-rotational direction to the other. By changing the rotational direction of the motor 6, the rotational direction of the spindle 8 is changed.

The operation panel 16 is provided on the battery-connect part 23. The operation panel 16 is operated by the user to switch a control mode of the motor 6. The operation panel 16 comprises an impact-force switch 16A and a special-purpose switch 16B. The impact-force switch 16A and the special-purpose switch 16B are each manipulated (pressed) by the user. By manipulating at least one of the impact-force switch 16A and the special-purpose switch 16B, the control mode of the motor 6 is switched.

The quick mode-switching button 17 is provided above the trigger switch 14. The quick mode-switching button 17 is manipulated (pressed) by the user. By manipulating (pressing) the quick mode-switching button 17, the control mode of the motor 6 is switched. Thus, the control mode (e.g., a maximum rotational speed of the motor 6) can be changed by either pressing the quick mode-switching button 17 or by pressing one or both of the impact-force switch 16A and the special-purpose switch 16B.

Light Unit

Figure 5:
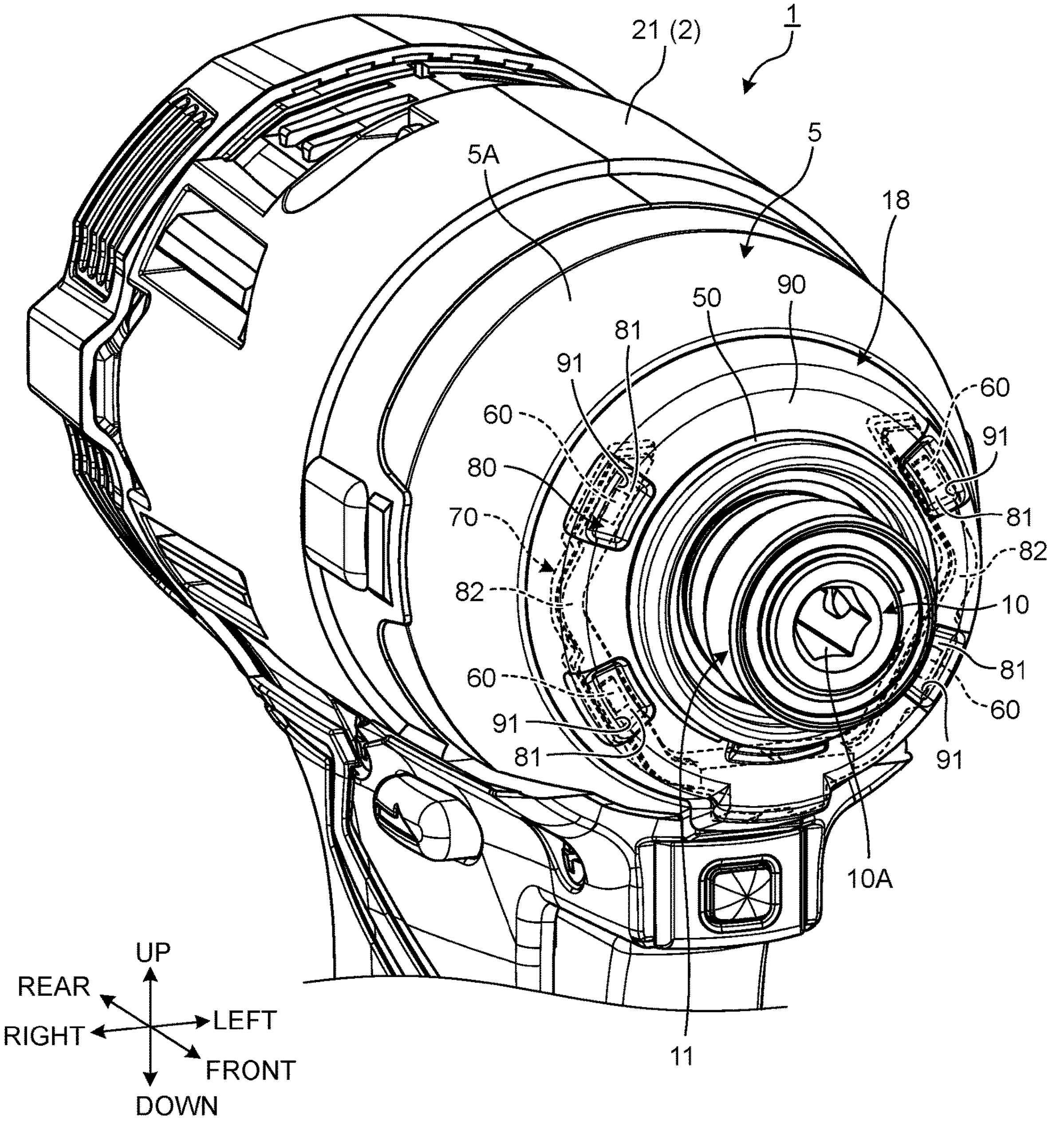
FIG. 5 is an oblique view that shows the upper portion of the power tool according to the first embodiment.
Figure 6:
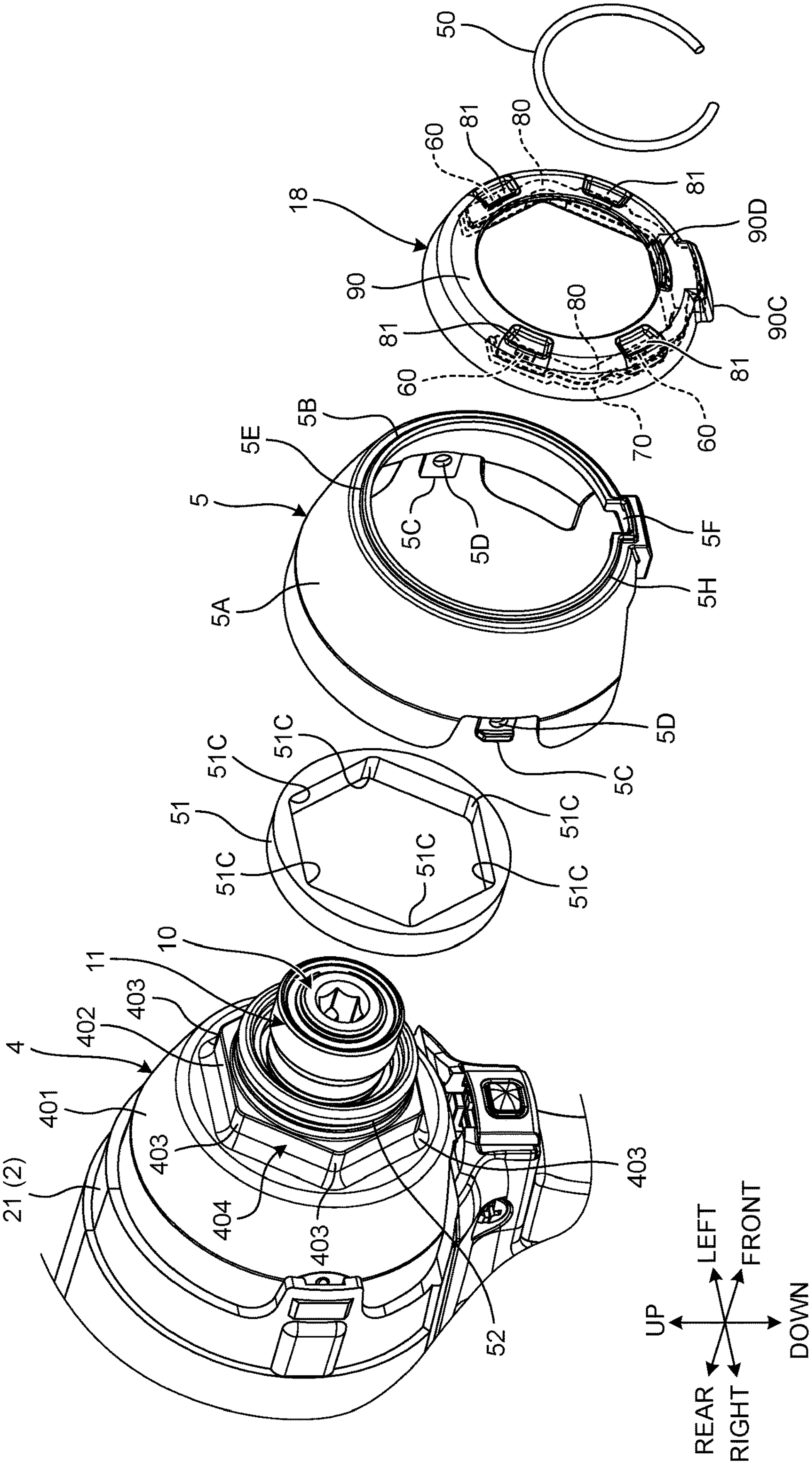
FIG. 6 is an exploded, oblique view that shows the upper portion of the power tool according to the first embodiment.
Figure 7:
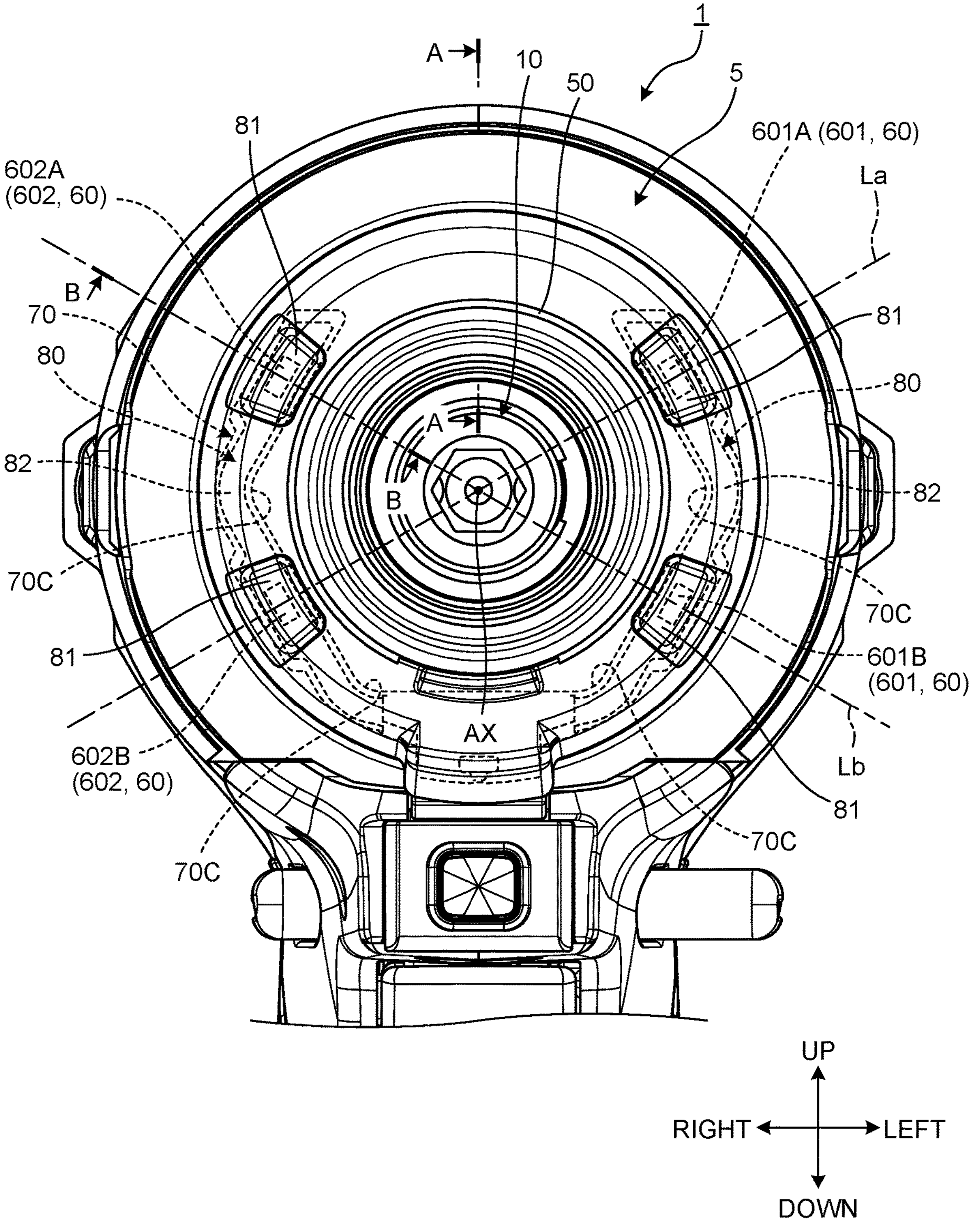
FIG. 7 is a front view that shows the upper portion of the power tool according to the first embodiment.
Figure 8:
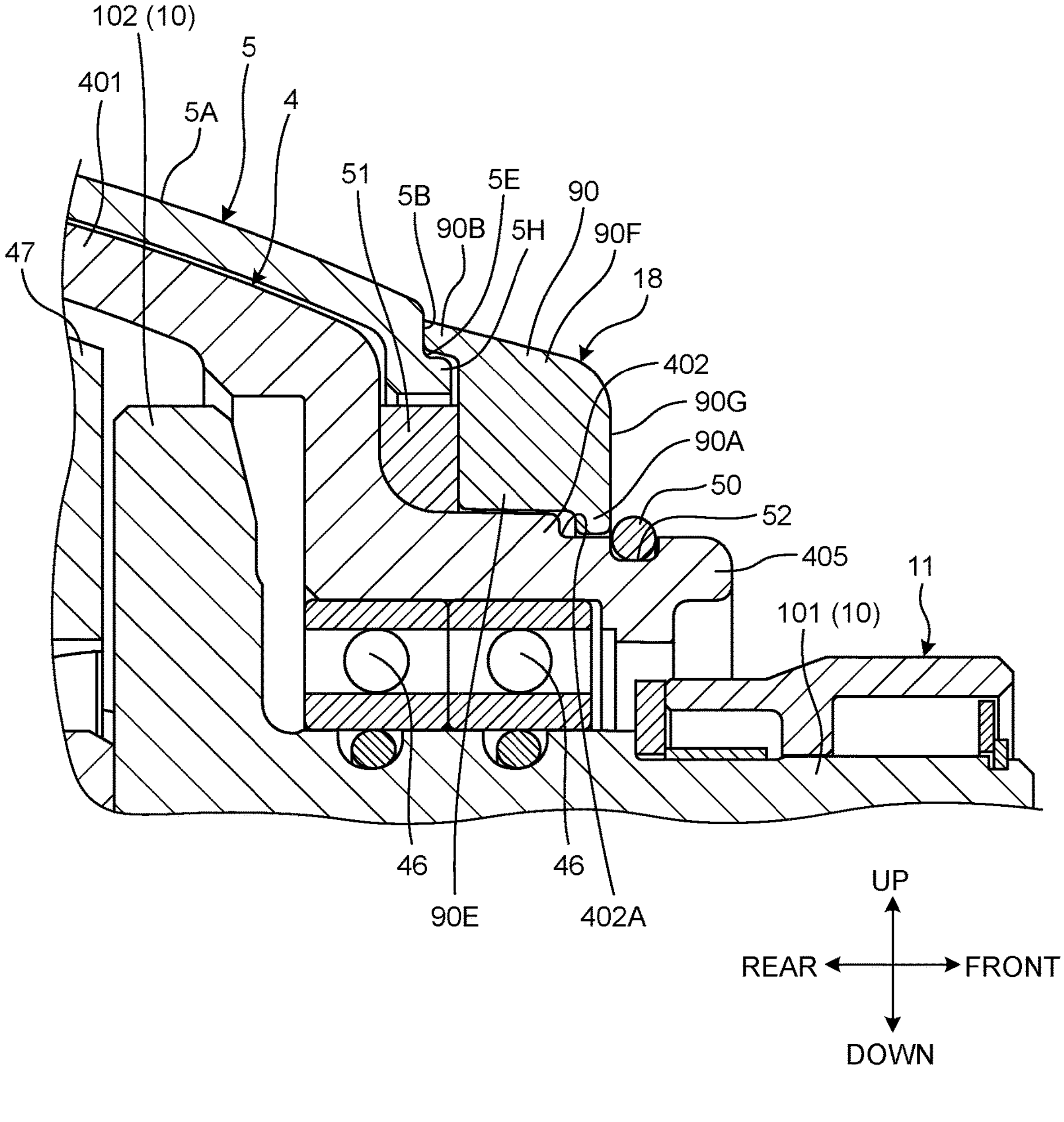
FIG. 8 is a cross-sectional auxiliary view taken along line A-A in FIG. 7.
Figure 9:
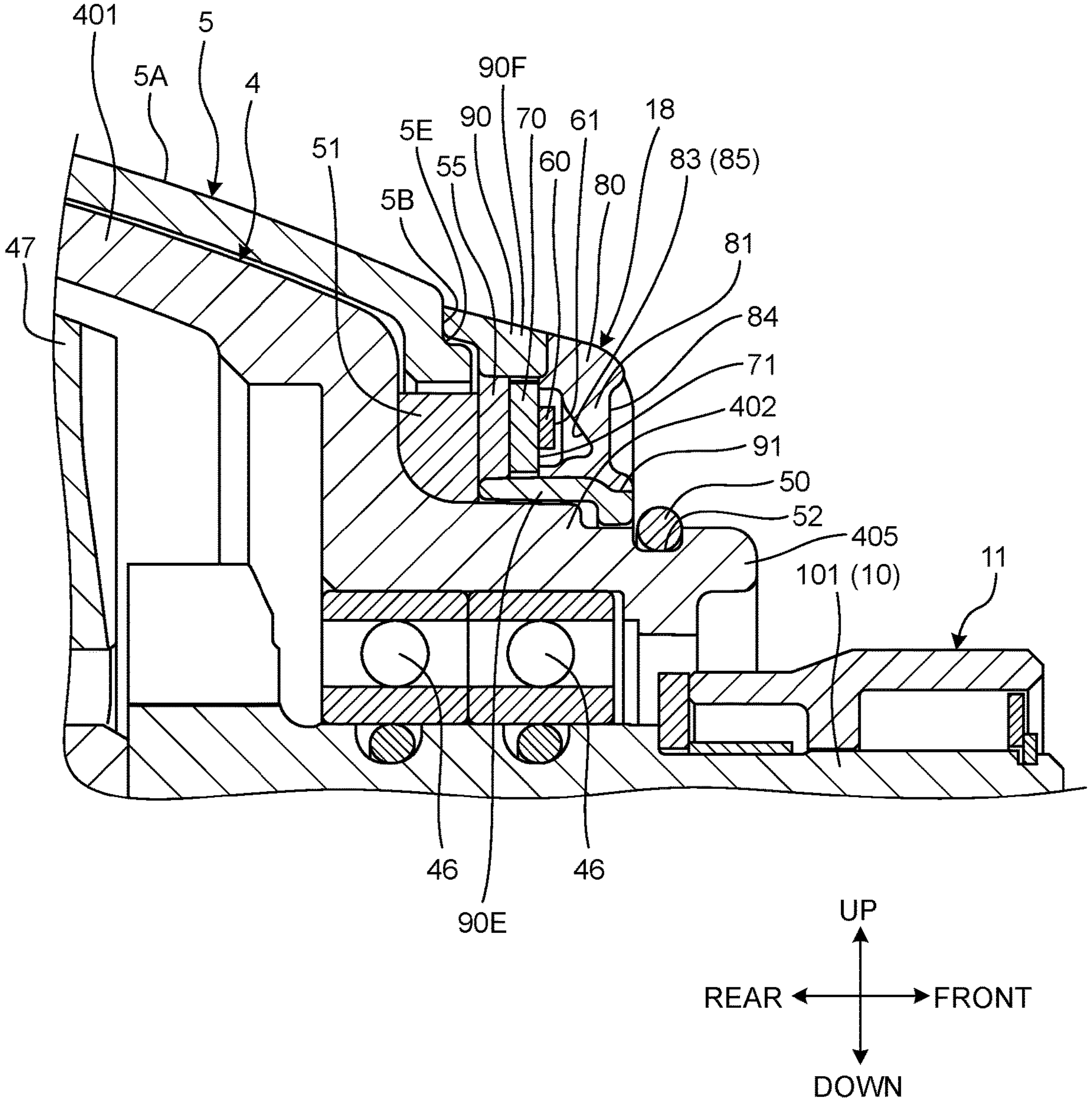
FIG. 9 is a cross-sectional auxiliary view taken along line B-B in FIG. 7.

FIG. 5 is an oblique view that shows the upper portion of the power tool 1 according to the first embodiment. FIG. 6 is an exploded, oblique view that shows the upper portion of the power tool 1. FIG. 7 is a front view that shows the upper portion of the power tool 1. FIG. 8 is a cross-sectional auxiliary view taken along line A-A in FIG. 7. FIG. 9 is a cross-sectional auxiliary view taken along line B-B in FIG. 7.

The power tool 1 comprises the light unit 18, a fixing member 50, and a cushion member 51.

The light unit 18 emits illumination light. The light unit 18 illuminates around the periphery of the anvil 10 with the illumination light. The light unit 18 illuminates forward of the anvil 10 with the illumination light. The light unit 18 illuminates the tool accessory, which is mounted on the anvil 10, and the periphery of the tool accessory, with the illumination light. The light unit 18 illuminates the work object being worked upon by the power tool 1 with the illumination light.

The light unit 18 is directly or indirectly supported on the hammer case 4. The light unit 18 is disposed at a front portion of the hammer case 4. The light unit 18 is disposed at least partially around the hammer case 4.

The hammer case 4 comprises a hammer-housing part 401, which is a first tube part, and a bearing-support part 402, which is a second tube part. The hammer-housing part 401 has a tube shape. The hammer-housing part 401 is disposed around the spindle 8 and the impact mechanism 9. The hammer-housing part 401 houses at least the spindle-shaft part 8B and the hammer 47. The bearing-support part 402 has a tube shape. The bearing-support part 402 is disposed more forward than the hammer-housing part 401. The outer diameter of the bearing-support part 402 is smaller than the outer diameter of the hammer-housing part 401. The bearing-support part 402 is disposed around the bearings 46. The bearing-support part 402 supports the bearings 46. A tip part 405 of the bearing-support part 402 is disposed around a rear portion of the bit sleeve 11.

The light unit 18 is disposed around the bearing-support part 402. The hammer-case cover 5 covers at least a portion of an outer surface of the hammer-housing part 401. A rear portion of the hammer-housing part 401 is housed in the motor-housing part 21 of the housing 2.

Figure 10:
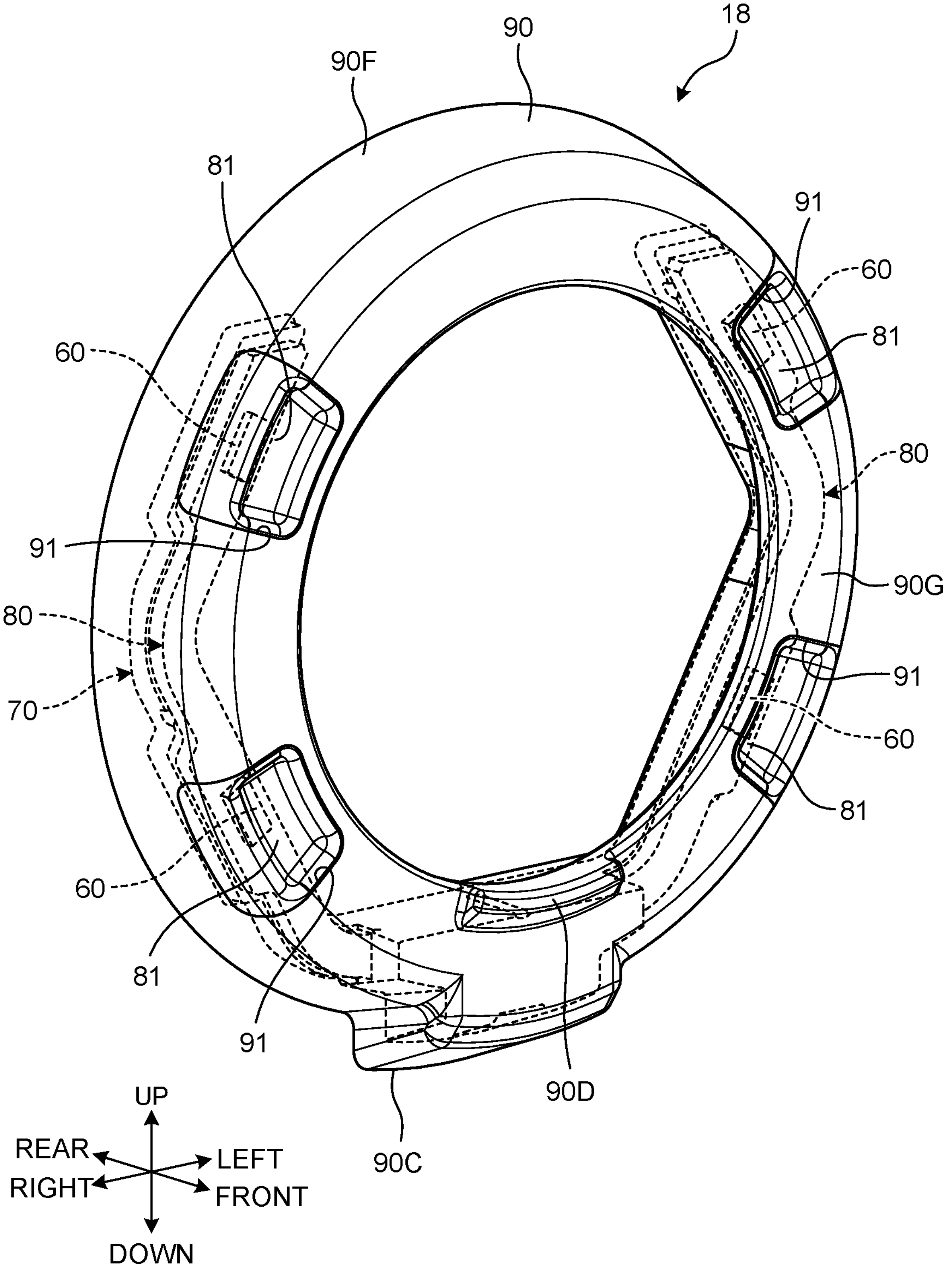
FIG. 10 is an oblique view, viewed from the front, that shows a light unit according to the first embodiment.
Figure 11:
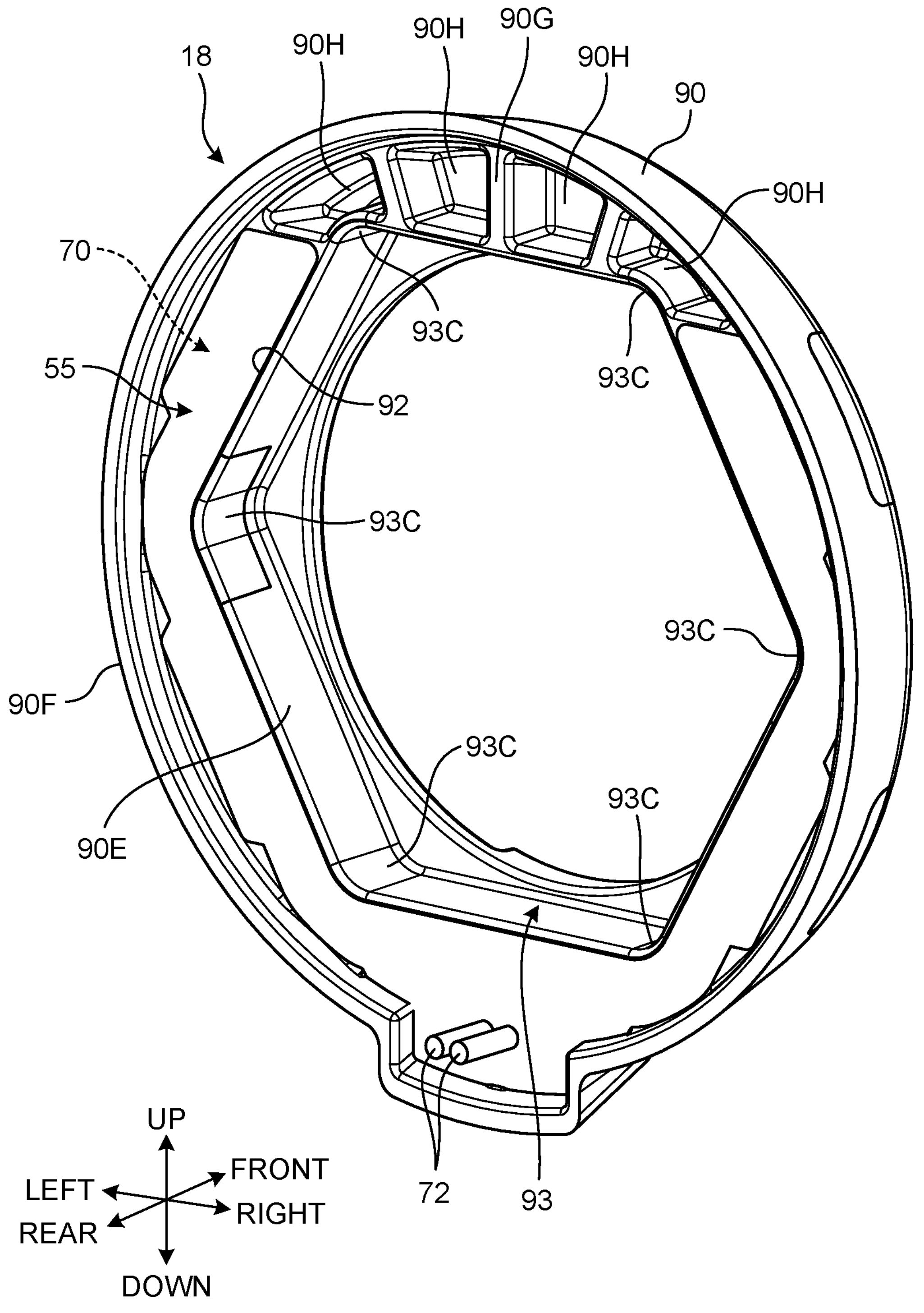
FIG. 11 is an oblique view, viewed from the rear, that shows the light unit according to the first embodiment.
Figure 12:
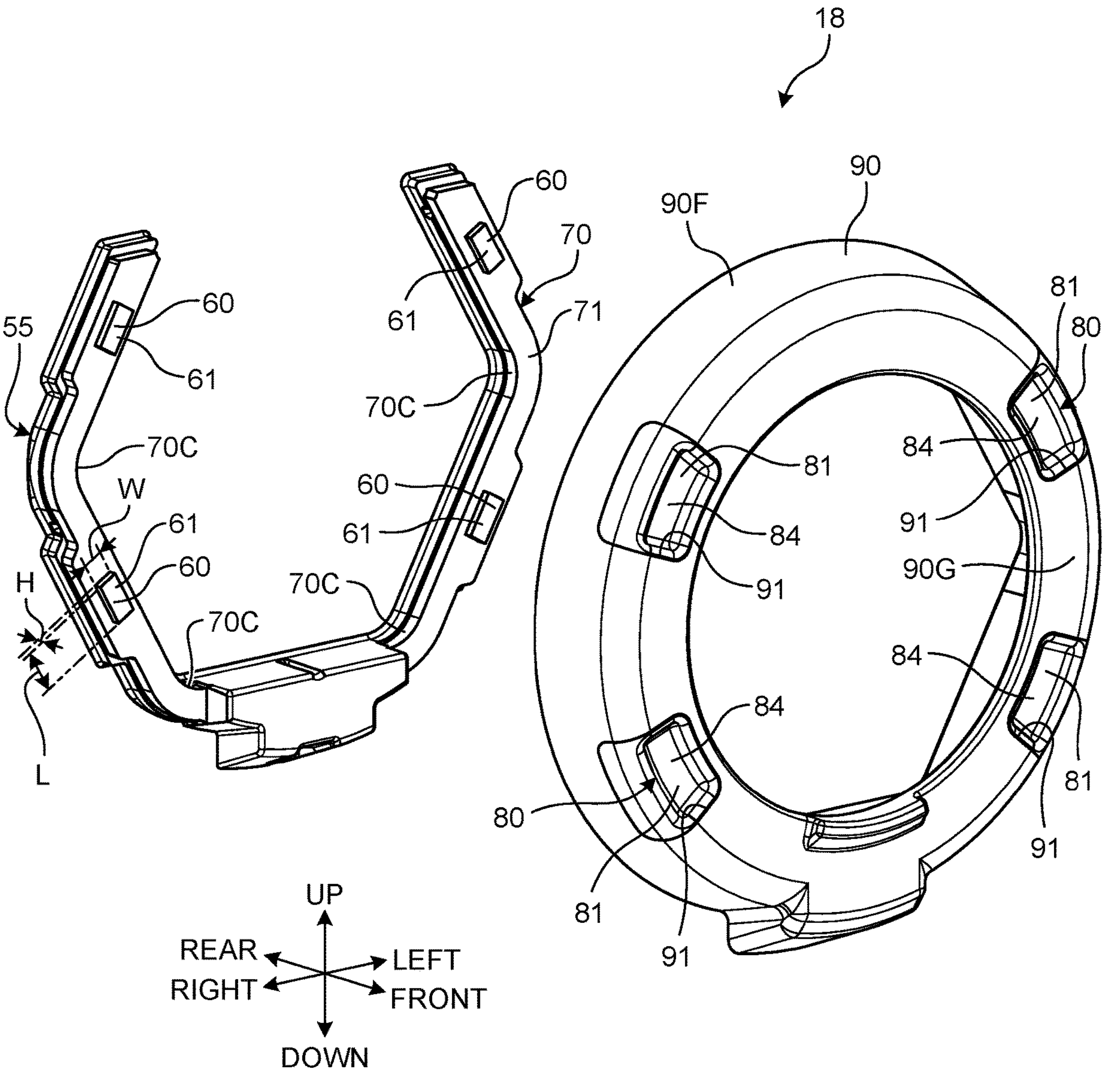
FIG. 12 is an exploded, oblique view, viewed from the front, that shows the light unit according to the first embodiment.
Figure 13:
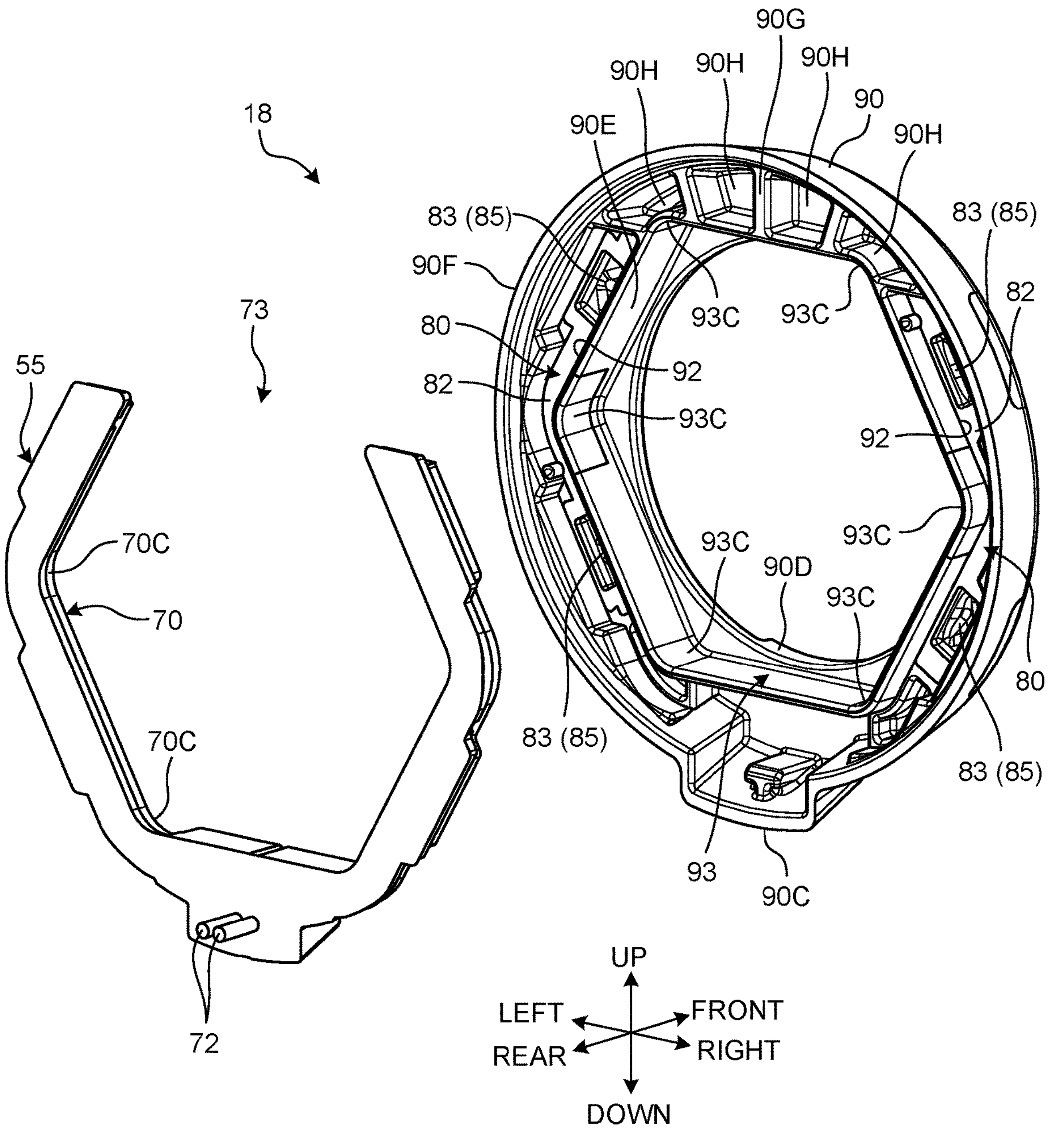
FIG. 13 is an exploded, oblique view, viewed from the rear, that shows the light unit according to the first embodiment.

FIG. 10 is an oblique view, viewed from the front, that shows the light unit 18 according to the first embodiment. FIG. 11 is an oblique view, viewed from the rear, that shows the light unit 18. FIG. 12 is an exploded, oblique view, viewed from the front, that shows the light unit 18. FIG. 13 is an exploded, oblique view, viewed from the rear, that shows the light unit 18.

The light unit 18 comprises lights 60, a circuit board 70, optical members 80, a cover member 90, and a bonding-resin part 55.

Each of the lights 60 is a light source that emits illumination light. Each of the lights 60 comprises a light-emitting diode (LED). Each of the lights 60 has a light-emitting surface 61 that emits illumination light. Each of the light-emitting surfaces 61 faces forward. A front surface of each of the lights 60 includes the corresponding light-emitting surface 61.

The plurality of the lights 60 is disposed such that the lights 60 are spaced apart around the anvil 10. In the embodiment, four of the lights 60 are disposed around the anvil 10.

The circuit board 70 supports the lights 60. The circuit board 70 comprises a printed circuit board (PCB). The circuit board 70 comprises wiring (conductive layers, traces) connected to the lights 60. Electric power (current) is supplied to the lights 60 via the wiring of the circuit board 70.

The circuit board 70 has a support surface 71, which supports the lights 60. The support surface 71 faces forward. The front surface of the circuit board 70 includes the support surface 71. The plurality of lights 60 is supported by the support surface 71 of the circuit board 70.

The circuit board 70 is disposed at least partially around the hammer case 4. In the first embodiment, the circuit board 70 is disposed partially around the hammer case 4. The circuit board 70 is disposed partially around the bearing-support part 402.

The lights 60 are mounted on the support surface 71 of the circuit board 70. In the embodiment, the light unit 18 comprises a surface-mount-type (SMD: surface-mount device) light-emitting diode. Each of the lights 60 comprises a so-called chip LED or LED chip.

The outer shape of each of the lights 60 is substantially rectangular-parallelepiped-shaped. As shown in FIG. 12, the length L of each of the lights 60 is 1.1 mm or more and 10.0 mm or less, the width W of each of the lights 60 is 1.1 mm or more and 10.0 mm or less, the height H of each of the lights 60 is 0.27 mm or more and 5.0 mm or less. For example, a light having a length of 3.0 mm, a width of 1.4 mm, and a height of 0.5 mm may be used for each of the lights 60.

The brightness of the illumination light emitted from the light-emitting surface 61 of each of the lights 60 is 5 lumens (lm) or more and 4,000 lm or less. The brightness of the illumination light may be, for example, 5 lm or more and 50 lm or less. In the first embodiment, a light that emits 10 lumens of illumination light is used for each of the lights 60.

The light-emitting surface 61 of each of the lights 60 is substantially a flat surface. Rotational axis AX of the anvil 10 and the normal lines of the light-emitting surfaces 61 are parallel to one another. The lights 60 are supported by the circuit board 70 such that rotational axis AX of the anvil 10 and the normal lines of the light-emitting surfaces 61 are parallel to one another.

The optical members 80 are disposed such that they respectively oppose (face) the light-emitting surfaces 61 of the lights 60. At least a portion of each of the optical members 80 is disposed more forward than the corresponding light 60 and the circuit board 70. Each of the optical members 80 comprises an optically transmissive part (e.g., a lens and/or prism) 81, which transmits the illumination light emitted from the light-emitting surface 61 of the corresponding light 60, and a coupling part 82, which is connected to the optically transmissive part 81.

Each of the optical members 80 is formed of an optically transmissive synthetic resin (polymer). In the first embodiment, each of the optical members 80 is formed of a polycarbonate. It is noted that each of the optical members 80 may be formed from an acrylic resin (e.g., a polyacrylate, such as poly(methyl methacrylate)).

The optically transmissive parts 81 are respectively disposed forward of the lights 60. The optically transmissive parts 81 are disposed such that they respectively oppose the light-emitting surfaces 61. Each of the optically transmissive parts 81 has an incident surface 83, upon which the illumination light emitted from the light-emitting surface 61 of the corresponding light 60 impinges, and an emergent surface 84, from which the illumination light is emitted. Each of the incident surfaces 83 opposes the corresponding light-emitting surface 61. In the first embodiment, each of the light-emitting surfaces 61 opposes the respective incident surfaces 83 across a gap (e.g., an air gap). It is noted, however, that at least a portion of the light-emitting surfaces 61 and a portion of the incident surfaces 83 may be in contact with one another.

Each of the optically transmissive parts 81 performs a lens and/or prism function. More specifically, the optically transmissive parts 81 refract illumination light emitted from the light-emitting surface 61 of each of the lights 60. Each of the optically transmissive parts 81 has a refractive surface 85, which refracts, radially outward of rotational axis AX or radially away from rotational axis AX, illumination light emitted from the light-emitting surface 61 of the corresponding light 60. Each of the optically transmissive parts 81 preferably at least deviates or deflects a light beam emitted from the respective light 60 so that the light beam propagates (advances) more radially outward of rotational axis AX of the output part 10 than in case no optically transmissive part 81 were to be disposed adjacent to the light 60. For example, the optically transmissive parts 81 each preferably deviate or deflect a light beam emitted from the light-emitting surface 61 of the light 60 by an angle of at least 5°, preferably at least 10°, preferably at least 15°, preferably at least 20°, preferably at least 25°, away from rotational axis AX. Optionally, the optically transmissive parts 81 each also preferably disperse (spread) the light beam, so that the light beam illuminates a larger surface area of the work object than in case no optically transmissive part 81 (or an optically transmissive part having no refractive power) were to be disposed between the light 60 and the surface of the work object. In the first embodiment, the incident surfaces 83 respectively include the refractive surfaces 85. As shown in FIG. 9, each of the refractive surfaces 85 is tilted such that the refractive surface 85 goes (extends) radially outward as it approaches the corresponding light 60. That is, in the embodiment, each of the incident surfaces 83 is tilted rearward as it extends radially outward. In other words, each of the refractive surfaces 85 is inclined with respect to rotational axis AX such that a radially-outward end of the refractive surface 85 is closer to the light-emitting surface 61 than a radially-inward end of the (same) refractive surface 85.

At least a portion of the cover member 90 is disposed more forward than the lights 60 and the circuit board 70. In the first embodiment, the cover member 90 is substantially ring-shaped.

The cover member 90 is formed of a synthetic resin (polymer). The cover member 90 may be formed of the same material as that of the optical members 80. In the alternative, the cover member 90 may be formed of a material that differs from the material of the optical members 80. In the embodiment, the cover member 90 is formed of a polycarbonate. It is noted that the cover member 90 may be formed from an acrylic resin (e.g., a polyacrylate, such as poly (methyl methacrylate)). In the first embodiment, the optical members 80 and the cover member 90 are formed integrally. For example, the optical members 80 and the cover member 90 may be formed integrally by insert molding.

Figure 15:
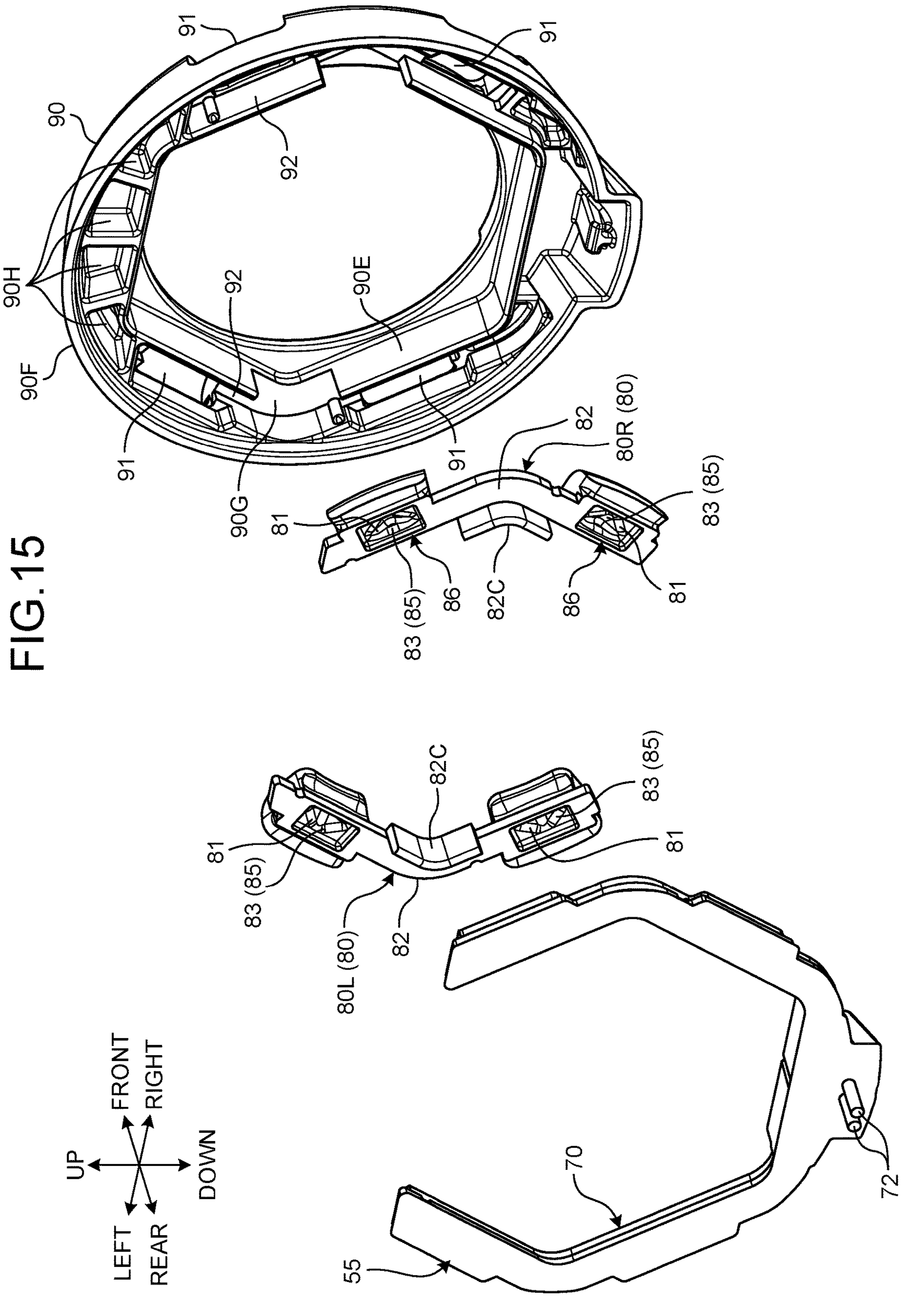
FIG. 15 is an exploded, oblique view, viewed from the rear, that shows the circuit board, the optical members, and the cover member according to the first embodiment.

The cover member 90 comprises an inner-circumference wall part 90E, an outer-circumference wall part 90F, and a front-wall part 90G. At least a portion of the front-wall part 90G is disposed such that it connects a front-end portion of the inner-circumference wall part 90E and a front-end portion of the outer-circumference wall part 90F. The front-wall part 90G is disposed on a front portion of the cover member 90. The front-wall part 90G is substantially ring-shaped. Hollow parts (hollow chambers) 90H are provided in an upper portion of the front-wall part 90G. As can be seen in FIGS. 11, 13 and 15, a groove 92 is provided on a rear portion of the front-wall part 90G, excluding the hollow parts 90H. The groove 92 is provided between the inner-circumference wall part 90E and the outer-circumference wall part 90F. The optical members 80 and the circuit board 70 are each disposed in the groove 92 of the cover member 90. The circuit board 70 is disposed in the groove 92 such that the light-emitting surfaces 61 of the lights 60 face forward. The circuit board 70 is disposed in the groove 92 such that the support surface 71 of the circuit board 70 faces forward.

In the first embodiment, openings 91 are provided in portions of the cover member 90. The openings 91 are provided in the front-wall part 90G. The optically transmissive parts 81 of the optical members 80 are disposed in the openings 91 of the cover member 90. The optically transmissive parts 81 are not covered by the cover member 90. That is, the cover member 90 is not disposed forward or rearward of the optically transmissive parts 81. The coupling parts 82 of the optical members 80 are fixed to the cover member 90.

The optical members 80 and the cover member 90 are disposed around the bearing-support part 402. The optical members 80 and the cover member 90 are disposed more forward than the hammer-case cover 5. The optical members 80 and the cover member 90 are supported on the hammer case 4 via the hammer-case cover 5.

The optical members 80 and the cover member 90 protect the lights 60 and the circuit board 70. The optical members 80 and the cover member 90 block contact of objects, which are around the periphery of the power tool 1, with the lights 60 and the circuit board 70. In greater detail, the optical members 80 and the cover member 90 block contact of objects, which are on the forward side of the optical members 80 and the cover member 90, with the lights 60 and the circuit board 70. In addition, the optical members 80 and the cover member 90 block contact of objects, which are radially outward of the optical members 80 and the cover member 90, with the lights 60 and the circuit board 70. The optical members 80 and the cover member 90 are integrally formed such that a gap is not formed between the optical members 80 and the cover member 90. The optical members 80 and the cover member 90 also provide a waterproofing function that blocks the penetration of moisture into the lights 60 and the circuit board 70. In greater detail, the optical members 80 and the cover member 90 block the penetration of moisture (water) from the forward sides of the optical members 80 and the cover member 90, the penetration of moisture from radially outward, and the penetration of moisture from radially inward. The optical members 80 and the cover member 90 have a dustproofing function that blocks the penetration of dust to the lights 60 and the circuit board 70. In greater detail, the optical members 80 and the cover member 90 block the penetration of dust from the forward sides of the optical members 80 and the cover member 90, the penetration of dust from radially outward directions, and the penetration of dust from radially inward directions.

The bonding-resin part 55 is fixed to the circuit board 70, the optical members 80, and the cover member 90. At least a portion of the bonding-resin part 55 covers a rear surface of the circuit board 70. The cover member 90 is fixed to the circuit board 70 by the bonding-resin part 55. The optical members 80 are fixed to the circuit board 70 via the cover member 90. The bonding-resin part 55 is disposed such that the front surface and the rear surface of the circuit board 70 are cut off from outside air. That is, the bonding-resin part 55 has a waterproofing function that blocks the penetration of moisture from the rearward side to the lights 60 and the circuit board 70. In addition, the bonding-resin part 55 has a dustproofing function that blocks the penetration of dust from the rearward side to the lights 60 and the circuit board 70. The lights 60 and the circuit board 70 are therefore isolated from moisture and dust by the bonding-resin part 55. Even if water or the like were to unintentionally contact the power tool 1, or even if the power tool 1 were to be used at a work site where dust is blowing about, the likelihood of an adverse breakdown of the lights 60 and the circuit board 70 is reduced.

Referring back to FIG. 8, the fixing member 50 makes contact with at least a portion of a front surface of the cover member 90. The fixing member 50 is supported on the tip part 405. The fixing member 50 makes contact with at least a portion of the front surface of the cover member 90 such that the light unit 18, which includes the optical members 80 and the cover member 90, does not come off of the bearing-support part 402 in the forward direction.

In the first embodiment, the fixing member 50 comprises a ring spring. A support groove 52 is provided on an outer surface of the bearing-support part 402. The support groove 52 is formed such that it surrounds rotational axis AX. The ring spring is disposed in the support groove 52. It is noted that the fixing member 50 is not limited to a ring spring and may be, for example, a bumper, a metal sleeve, a circlip (e.g., a C-clip or snap ring), or the like.

At least a portion of the cover member 90 makes contact with the hammer-case cover 5. In the first embodiment, at least a portion of a rear portion of the cover member 90 makes contact with the hammer-case cover 5. The light unit 18, which comprises the cover member 90, is sandwiched in the front-rear direction between the fixing member 50 and the hammer-case cover 5.

As further shown in FIG. 8, in the first embodiment, a front-end part 5H of the hammer-case cover 5 is disposed radially inward of a rear-end portion of the cover member 90. The outer surface of the cover member 90 is not covered by the hammer-case cover 5.

The cushion member 51 is disposed between the cover member 90 and the hammer case 4. The cushion member 51 impedes or attenuates the transmission of vibration from the hammer case 4 to the light unit 18. The cushion member 51 also reduces the transmission of heat from the hammer case 4 to the light unit 18. The cushion member 51 makes contact with the light unit 18. In the first embodiment, the cushion member 51 makes contact with the cover member 90 and the bonding-resin part 55. The cushion member 51 makes contact with the hammer case 4. In addition, the cushion member 51 functions as a bumper in the event that the light unit 18 makes contact with a peripheral object. That is, the cushion member 51 also performs a function, e.g., a shock absorbing function, of absorbing impacts received by the light unit 18.

A porous member made of a synthetic resin (e.g., a polymer, such as an elastomer, preferably a foam elastomer) is an illustrative example of the cushion member 51. A soft-urethane sponge, e.g., polyurethane foam, is a specific illustrative example of a porous member according to the present teachings.

As shown in FIG. 8, the cover member 90 comprises a front-side support part 90A and a rear-side support part 90B. The front-side support part 90A is disposed in a recessed part 402A, which is provided on an outer surface of the bearing-support part 402. The rear-side support part 90B is disposed in a recessed part 5E, which is provided on the front-end part 5H of the hammer-case cover 5.

The hammer-case cover 5 is fixed to the motor-housing part 21 of the housing 2. As shown in FIG. 6, the hammer-case cover 5 has a cover part 5A, a ring part 5B, hook parts 5C, and openings 5D. The cover part 5A covers at least a portion of an outer surface of the hammer-housing part 401. The cover part 5A has a tube shape. The ring part 5B is disposed on a front-end portion of the cover part 5A. The ring part 5B opposes a rear-end portion of the cover member 90. The hook parts 5C are disposed at a rear portion of the cover part 5A. The hook parts 5C are hooked to the housing 2.

As shown in FIG. 6, a notch 5F is provided at a lower portion of the front-end part 5H of the hammer-case cover 5. An engaging part 90C, which is provided on a lower portion of the cover member 90, is fitted into the notch 5F. Thereby, relative rotation between the hammer-case cover 5 and the cover member 90 is restricted (blocked). In addition, a latching part 90D, which blocks rotation of the fixing member 50, is provided at a lower portion of a front-end portion of the cover member 90. Relative rotation between the cover member 90 and the fixing member 50 is restricted (blocked) by the latching part 90D.

As shown in FIG. 6, the bearing-support part 402 comprises angled parts 403, which protrude radially outward. Six of the angled parts 403 are provided equispaced around rotational axis AX. In the first embodiment, at least a portion of the bearing-support part 402 has a hexagon shape in a plane orthogonal to rotational axis AX. In the explanation below, the hexagonal portion of the bearing-support part 402 that includes the six angled parts 403 is called a rotation-stop part 404 where appropriate.

As shown in FIG. 6, the cushion member 51 has a ring shape. The cushion member 51 is disposed around the rotation-stop part 404 of the bearing-support part 402. The cushion member 51 is formed such that it conforms to the outer shape of the rotation-stop part 404 of the bearing-support part 402. The cushion member 51 has recessed parts 51C, in which the angled parts 403 of the rotation-stop part 404 are respectively disposed. Six of the recessed parts 51C are provided on an inner surface of the cushion member 51 such that the six angled parts 403 are respectively disposed in the recessed parts 51C. When the angled parts 403 are disposed in the recessed parts 51C, relative rotation between the cushion member 51 and the bearing-support part 402 is restricted (blocked).

The circuit board 70 is disposed radially outward of the bearing-support part 402. As shown in FIG. 7, the circuit board 70 is formed such that it conforms to the outer shape of the rotation-stop part 404 of the bearing-support part 402. The circuit board 70 has recessed parts 70C, which are respectively disposed on the angled parts 403 of the rotation-stop part 404. When the angled parts 403 are disposed in the recessed parts 70C, relative rotation between the circuit board 70 and the bearing-support part 402 is restricted (blocked).

Referring to FIGS. 11 and 13, the inner-circumference wall part 90E defines a housing part 93, in which the rotation-stop part 404 of the bearing-support part 402 is disposed. The housing part 93 is provided on the inner side of the inner-circumference wall part 90E. The inner-circumference wall part 90E is formed such that it conforms to the outer shape of the rotation-stop part 404. As shown in FIG. 9, the inner-circumference wall part 90E is disposed between the circuit board 70 and the bearing-support part 402. Contact between the circuit board 70 and the bearing-support part 402 is blocked by the inner-circumference wall part 90E.

The plurality of lights 60 is installed on the circuit board 70. The plurality of lights 60 is provided around rotational axis AX. As shown in FIG. 7, in the embodiment, the lights 60 comprise a plurality of left lights 601, which is provided on the left side of rotational axis AX, and a plurality of right lights 602, which is provided on the right side of rotational axis AX. The number of the right lights 602 provided is the same as that of the left lights 601.

In the embodiment, four of the lights 60 are provided on the circuit board 70. Two of the left lights 601 are provided. The left lights 601 comprise a left light 601A and a left light 601B. Two of the right lights 602 are provided. The right lights 602 comprise a right light 602A and a right light 602B.

In the radial direction, the distance between rotational axis AX and the left light 601A, the distance between rotational axis AX and the left light 601B, the distance between rotational axis AX and the right light 602A, and the distance between rotational axis AX and the right light 602B are substantially equal. When a diagonal line La and a diagonal line Lb, which pass through and are orthogonal to rotational axis AX, are defined as shown in FIG. 7, the left light 601A and the right light 602B are disposed along diagonal line La, and the left light 601B and the right light 602A are disposed along diagonal line Lb. In addition, the left light 601A and the right light 602A are disposed upward of rotational axis AX, and the left light 601B and the right light 602B are disposed downward of rotational axis AX. In the up-down direction, the location of the left light 601A and the location of the right light 602A are substantially the same. In the up-down direction, the location of the left light 601B and the location of the right light 602B are substantially the same. In the left-right direction, the location of the left light 601A and the location of the left light 601B are substantially the same. In the left-right direction, the location of the right light 602A and the location of the right light 602B are substantially the same. When an axis of symmetry, which passes through rotational axis AX and extends in the up-down direction, is defined, the left lights 601 (601A, 601B) and the right lights 602 (602A, 602B) are line symmetric.

The circuit board 70 is disposed partially around rotational axis AX. A notch (gap, opening) 73 is formed at an upper portion of the circuit board 70.

The cover member 90 has a ring shape. The optical members 80 are formed integrally with the cover member

90. The optical members 80 and the circuit board 70 are disposed in the groove 92. The circuit board 70 is disposed in the groove 92 such that the light-emitting surfaces 61 of the lights 60 face forward.

The rotation-stop part 404 of the bearing-support part 402 is disposed in the housing part 93 of the cover member 90. The housing part 93 is defined radially inward of the inner-circumference wall part 90E. The inner-circumference wall part 90E is formed such that it conforms to the outer shape of the rotation-stop part 404. The housing part 93 has recessed parts 93C, in which the angled parts 403 of the rotation-stop part 404 are respectively disposed. Six of the recessed parts 93C are provided on the cover member 90 such that the six angled parts 403 are respectively disposed in the recessed parts 93C. When the angled parts 403 are disposed in the recessed parts 93C, relative rotation between the cover member 90 and the bearing-support part 402 is restricted (blocked).

The bonding-resin part 55 fixes the circuit board 70 and the cover member 90. At least a portion of the bonding-resin part 55 covers a rear surface of the circuit board 70. After the circuit board 70 has been disposed in the groove 92 such that the light-emitting surfaces 61 of the lights 60 face forward, synthetic resin (adhesive) in the molten or liquid state is supplied, from rearward of the circuit board 70, to the boundary between the circuit board 70 and the cover member 90. The bonding-resin part 55 is formed by the hardening or curing (solidification) of the synthetic resin (adhesive). When the synthetic resin has hardened or cured, the circuit board 70 and the cover member 90 are fixed by the bonding-resin part 55.

Optical Members

Figure 14:
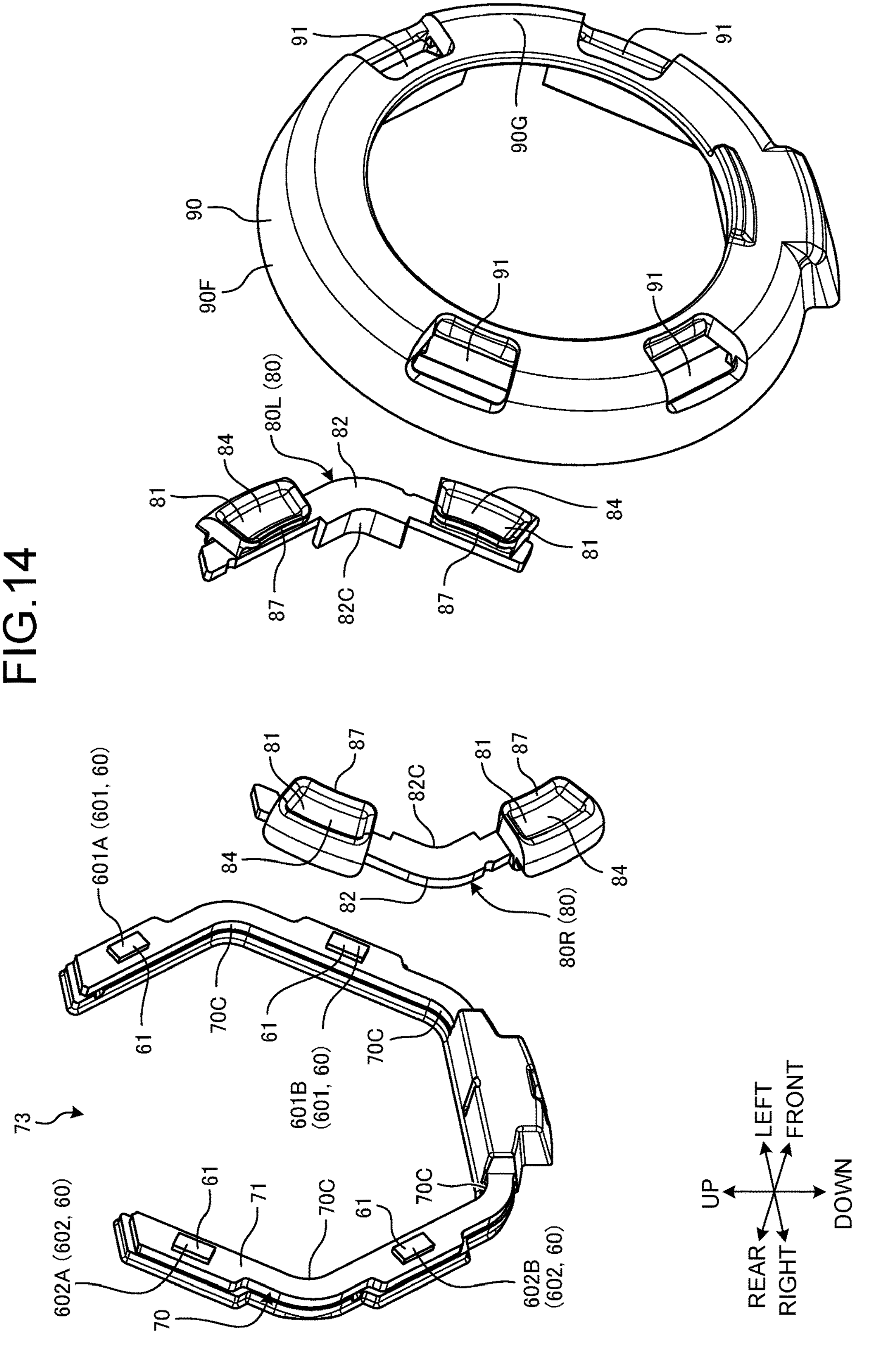
FIG. 14 is an exploded, oblique view, viewed from the front, that shows a circuit board, optical members, and a cover member according to the first embodiment.
Figure 16:
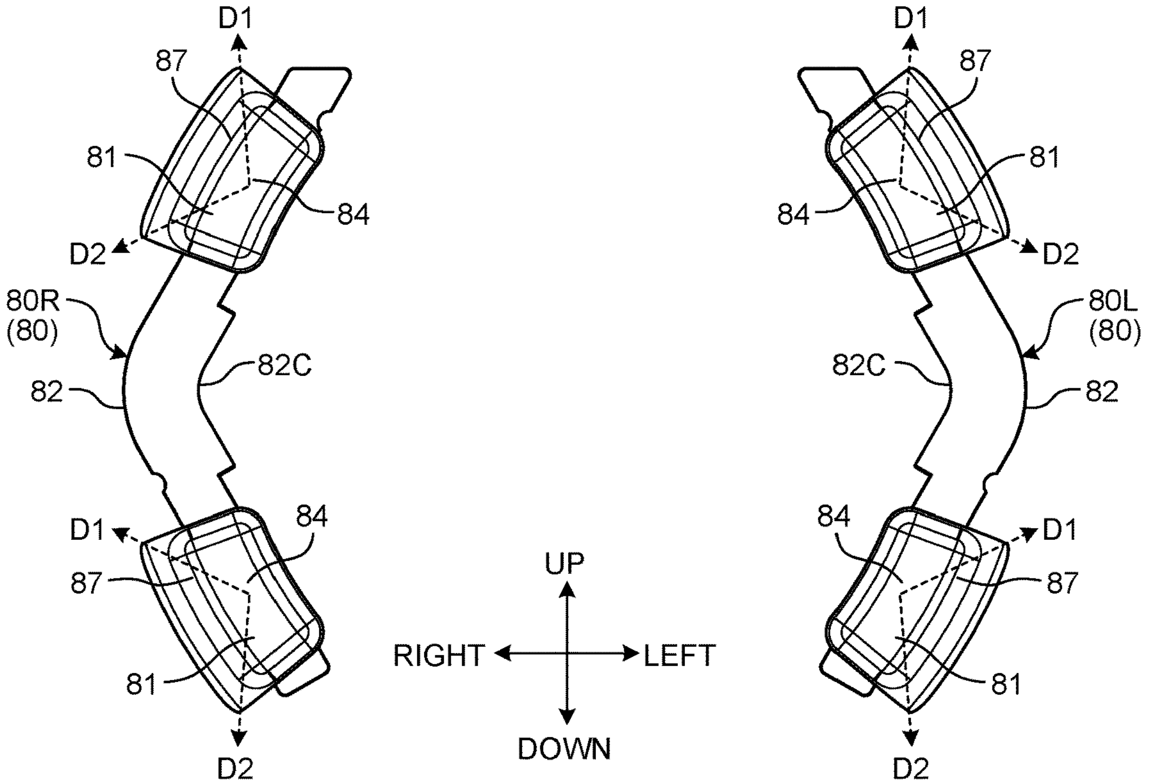
FIG. 16 is a drawing, viewed from the front, that shows the optical members according to the first embodiment.
Figure 17:
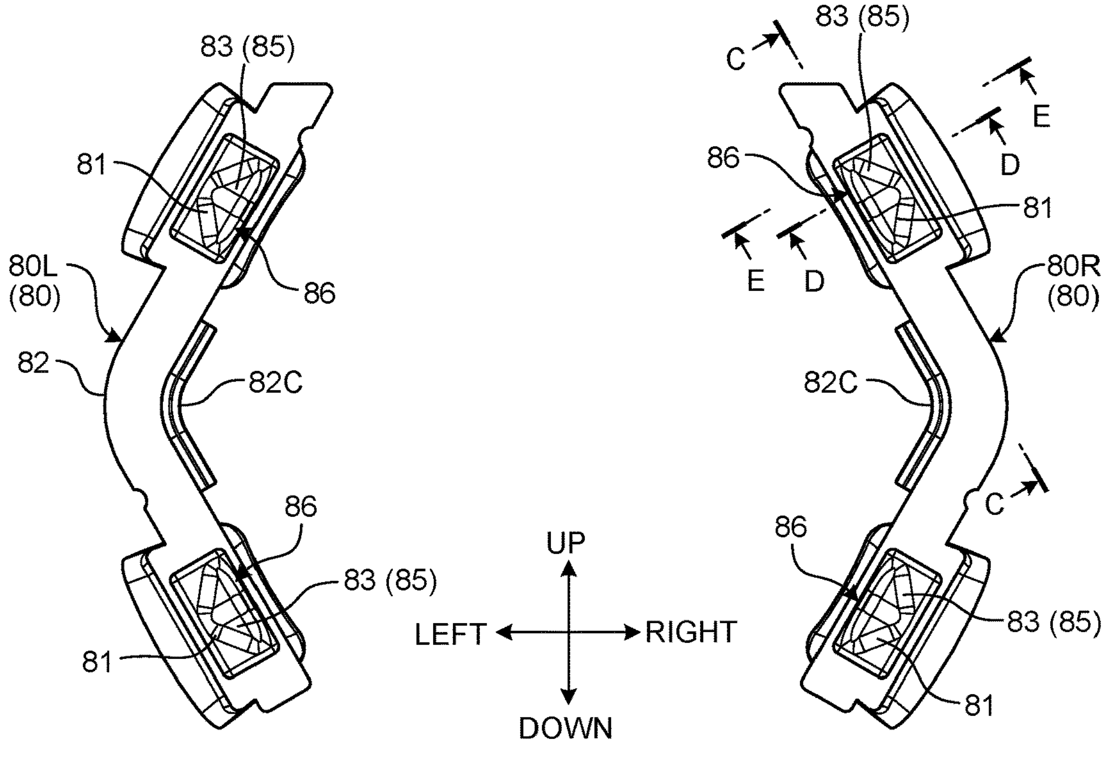
FIG. 17 is a drawing, viewed from the rear, that shows the optical members according to the first embodiment.
Figure 18:
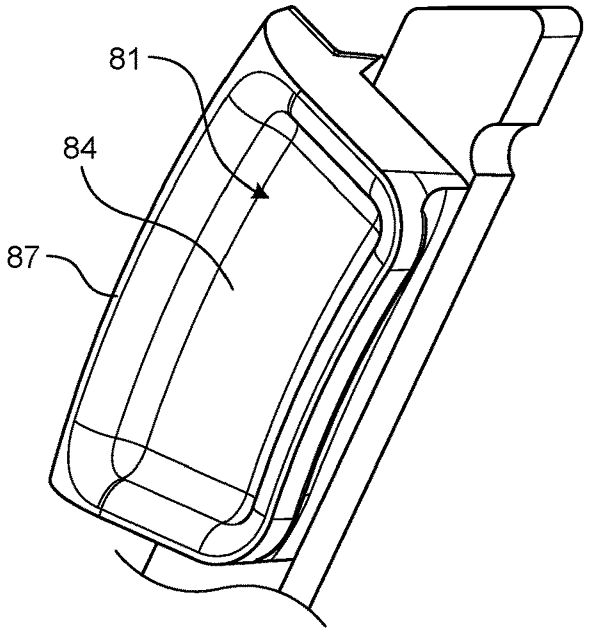
FIG. 18 is an oblique view, viewed from the front, that shows an optically transmissive part of the optical member according to the first embodiment.
Figure 19:
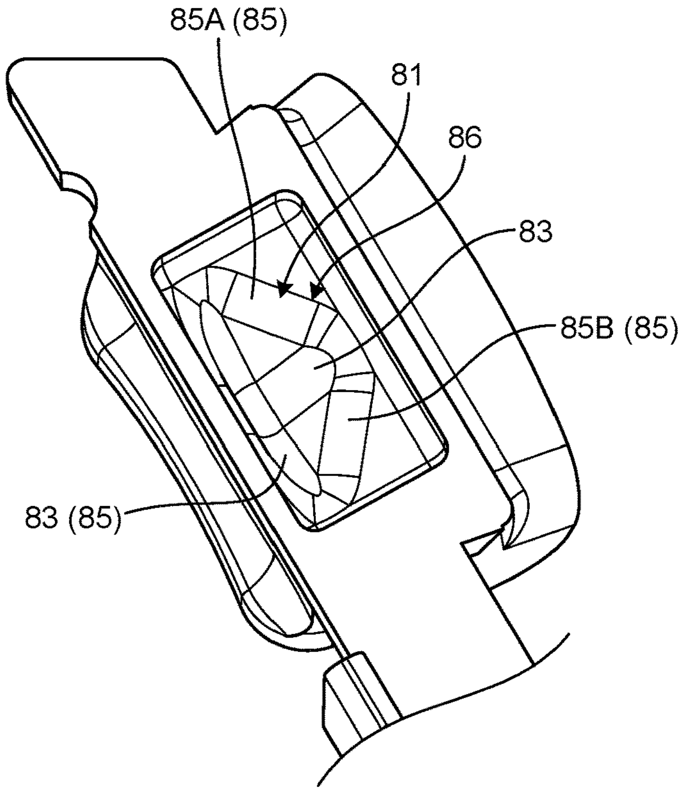
FIG. 19 is an oblique view, viewed from the rear, that shows the optically transmissive part of the optical member according to the first embodiment.
Figure 20:
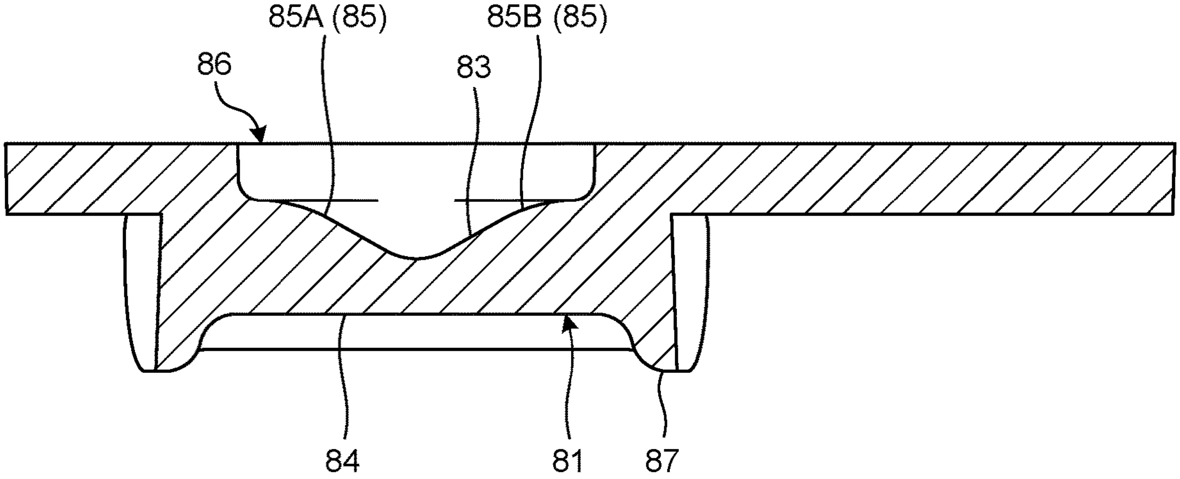
FIG. 20 is a cross-sectional auxiliary view taken along line C-C in FIG. 17.
Figure 21:
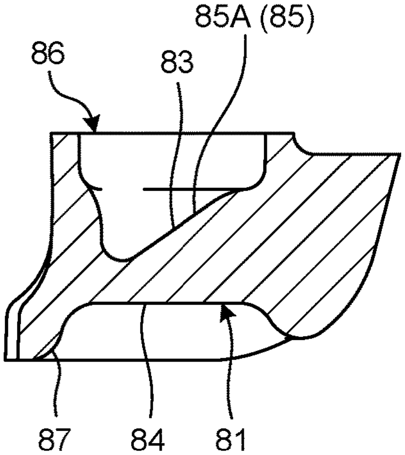
FIG. 21 is a cross-sectional auxiliary view taken along line D-D in FIG. 17.
Figure 22:
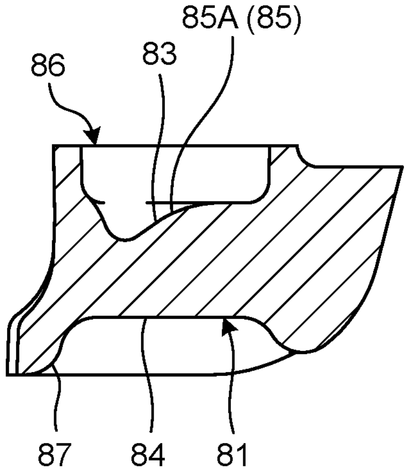
FIG. 22 is a cross-sectional auxiliary view taken along line E-E in FIG. 17.

FIG. 14 is an exploded, oblique view, viewed from the front, that shows the circuit board 70, the optical members 80, and the cover member 90 according to the first embodiment. FIG. 15 is an exploded, oblique view, viewed from the rear, that shows the circuit board 70, the optical members 80, and the cover member 90. FIG. 16 is a drawing, viewed from the front, that shows the optical members 80. FIG. 17 is drawing, viewed from the rear, that shows the optical members 80. FIG. 18 is an oblique view, viewed from the front, that shows the optically transmissive part 81 of the optical member 80. FIG. 19 is an oblique view, viewed from the rear, that shows the optically transmissive part 81 of the optical member 80. FIG. 20 is a cross-sectional auxiliary view taken along line C-C in FIG. 17. FIG. 21 is a cross-sectional auxiliary view taken along line D-D in FIG. 17. FIG. 22 is a cross-sectional auxiliary view taken along line E-E in FIG. 17.

The light unit 18 comprises: the lights 60; the circuit board 70, which supports the lights 60; the optical members 80; and the cover member 90. Lead wires 72 (see FIG. 15) are provided at a lower portion of the circuit board 70. The optical members 80 are formed integrally with the cover member 90.

Each of the optical members 80 comprises: two optically transmissive parts 81, which transmit illumination light emitted from the corresponding lights 60; and one coupling part 82, which is connected to the two optically transmissive parts 81. Thus, a plurality of the optically transmissive parts 81 is provided. The number of the optically transmissive parts 81 and the number of the lights 60 are equal. One of the optically transmissive parts 81 is disposed for each of the lights 60 such that one optically transmissive part 81 opposes (faces) one light 60. In the first embodiment, four of the optically transmissive parts 81 are provided.

In the first embodiment, the optical members 80 comprise an optical member 80L, which is disposed on the left side of rotational axis AX, and an optical member 80R, which is disposed on the right side of rotational axis AX.

As shown in FIG. 14, the optical member 80L comprises two of the optically transmissive parts 81, which transmit the illumination light emitted from the corresponding left lights 601. With regard to the optical member 80L, one of the optically transmissive parts 81 is disposed such that it opposes the light-emitting surface 61 of the left light 601A, and the other optically transmissive part 81 is disposed such that it opposes the light-emitting surface 61 of the left light 601B. With regard to the optical member 80L, the coupling part 82 is disposed such that it connects the two corresponding optically transmissive parts 81.

As shown in FIG. 14, the optical member 80R comprises two of the optically transmissive parts 81, which transmit illumination light emitted from the corresponding right lights 602. With regard to the optical member 80R, one of the optically transmissive parts 81 is disposed such that it opposes the light-emitting surface 61 of the right light 602A, and the other optically transmissive part 81 is disposed such that it opposes the light-emitting surface 61 of the right light 602B. With regard to the optical member 80R, the coupling part 82 is disposed such that it connects the two corresponding optically transmissive parts 81.

Each of the coupling parts 82 is formed such that it conforms to the outer shape of the rotation-stop part 404 of the bearing-support part 402. Each of the coupling parts 82 has a recessed part 82C, in which the corresponding angled part 403 of the rotation-stop part 404 is disposed. When the angled parts 403 are respectively disposed in the recessed parts 82C, relative rotation between the optical members 80 and the bearing-support part 402 is restricted (blocked).

Each of the optically transmissive parts 81 has the incident surface 83, on which illumination light emitted from the corresponding light 60 impinges, and the emergent surface 84, from which illumination light transmitted through the optically transmissive part 81 emerges. At least a portion of the incident surface 83 is not parallel to the emergent surface 84. For example, at least 80%, e.g., at least 90%, of the incident surface 83 is not parallel to the emergent surface 84. In other words, the surface area of the refractive surface 85 is preferably at least 80%, e.g., at least 90%, of total surface area of the incident surface 83.

The incident surfaces 83 are disposed such that they respectively oppose the light-emitting surfaces 61 of the lights 60. In the embodiment, a recessed part 86 is formed at a portion of a rear surface of each of the optical members 80. Each of the recessed parts 86 is formed such that it is recessed forward from the rear surface of the corresponding optical member 80. The outer shape of each of the recessed parts 86 is substantially triangle-shaped in a plane orthogonal to rotational axis AX. Each of the incident surfaces 83 includes the inner surface of the corresponding recessed part 86. At least a portion of each of the incident surfaces 83 is tilted rearward as it goes radially outward. The illumination light emitted from the light-emitting surface 61 of each of the lights 60 is refracted radially outward of rotational axis AX at the corresponding incident surface 83. Each of the incident surfaces 83 functions as a refractive surface 85 that refracts illumination light radially outward.

As shown in FIG. 20, each of the incident surfaces 83 includes a first refractive surface 85A, which refracts illumination light emitted from the corresponding light 60 in a first direction D1, and a second refractive surface 85B, which refracts illumination light emitted from the corresponding light 60 in a second direction D2 (as shown in FIG. 16). The first refractive surface 85A is tilted rearward as it goes radially outward and is also tilted rearward as it goes toward one side in the circumferential direction. The second refractive surface 85B is tilted rearward as it goes radially outward and is also tilted rearward as it goes toward the other side in the circumferential direction.

First direction D1 extends radially outward and goes toward the one side in the circumferential direction. As shown in FIG. 16, after illumination light emitted from the light-emitting surfaces 61 of the lights 60 has been refracted at (by) the first refractive surfaces 85A, the light emerges from the emergent surfaces 84 and advances (propagates) radially outward (away from rotational axis AX) and toward the one side in the circumferential direction.

Second direction D2 also extends radially outward, but goes toward the other side in the circumferential direction. As shown in FIG. 16, after illumination light emitted from the light-emitting surfaces 61 of the lights 60 has been refracted at (by) the second refractive surfaces 85B, the light emerges from the emergent surfaces 84 and advances (propagates) radially outward (away from rotational axis AX) and toward the other side in the circumferential direction.

Each of the emergent surfaces 84 is disposed such that it faces forward. In the first embodiment, each of the emergent surfaces 84 is a flat surface. Rotational axis AX and normal lines of the respective emergent surfaces 84 are parallel to one another in the first embodiment. However, it is noted that the normal lines of the emergent surfaces 84 do not have to be parallel to rotational axis AX. Each of the optical members 80 comprises a circumferential-wall part 87, which is disposed such that it surrounds the optical path of the illumination light that emerges from the corresponding emergent surface 84. Each of the circumferential-wall parts 87 protrudes forward from a circumferential-edge portion of the corresponding emergent surface 84. Each of the emergent surfaces 84 is disposed more rearward than a front-end portion of the corresponding circumferential-wall part 87. Contact between objects, which are around the periphery of the power tool 1, and the emergent surfaces 84 is blocked by the circumferential-wall parts 87. Because contact between objects and the emergent surfaces 84 is blocked, the likelihood of damage to the emergent surfaces 84 can be reduced.

Assembly of Power Tool

Figure 23:
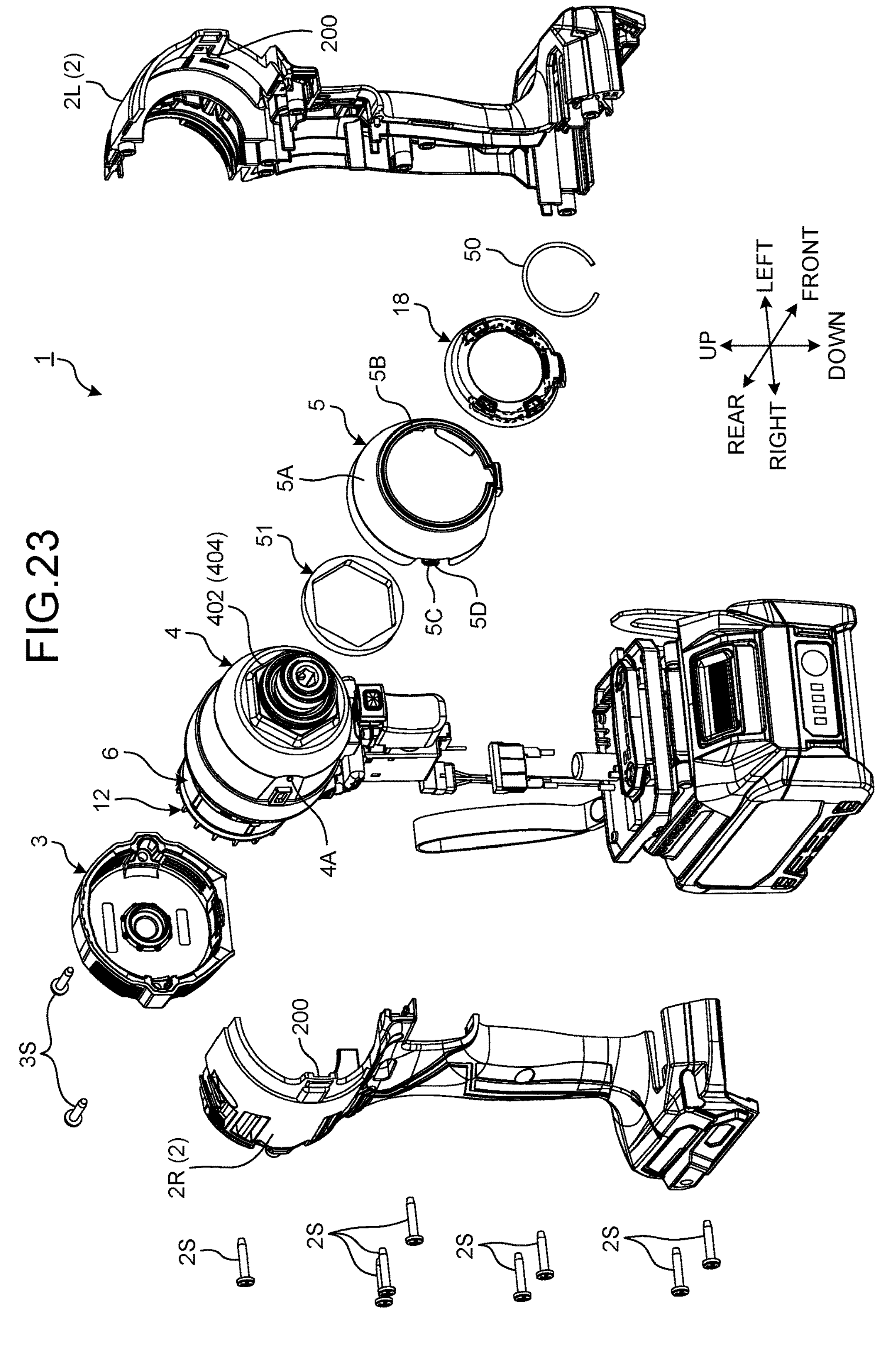
FIG. 23 is an exploded, oblique view that shows the power tool according to the first embodiment.

FIG. 23 is an exploded, oblique view that shows the power tool 1 according to the first embodiment. The housing 2 comprises the left housing 2L and the right housing 2R. In the first embodiment, at least a portion of the hammer-case cover 5 is fixed to the housing 2 by virtue of being sandwiched between the left housing 2L and the right housing 2R. In the first embodiment, a rear portion of the cover part 5A and the hook parts 5C are sandwiched by the left housing 2L and the right housing 2R.

The hook parts 5C are respectively provided at a left portion and a right portion of the cover part 5A. Recessed parts 200, to which the hook parts 5C are hooked, are respectively provided on an inner surface of the left housing 2L and an inner surface of the right housing 2R.

Protruding parts 4A, which position the hammer-case cover 5, are provided on portions of the hammer case 4. The openings 5D (refer to FIG. 6) are provided in portions of the hammer-case cover 5. The hammer case 4 and the hammer-case cover 5 are positioned by virtue of the protruding parts 4A being disposed in the openings 5D.

When the power tool 1 is to be assembled, the hammer case 4 and the hammer-case cover 5 are connected such that an outer surface of the hammer-housing part 401 is covered by the cover part 5A. By disposing the protruding parts 4A in the openings 5D, the outer surface of the hammer-housing part 401 is covered by the cover part 5A. Then, the cushion member 51 and the light unit 18 are mounted on the bearing-support part 402. The cushion member 51 and the light unit 18 are each inserted into the bearing-support part 402 from forward of the bearing-support part 402. The cushion member 51 and the light unit 18 are mounted on the rotation-stop part 404. After the cushion member 51 and the light unit 18 have each been mounted on the rotation-stop part 404, the fixing member 50 is disposed in the support groove 52. After the hammer case 4 and the hammer-case cover 5 are connected and the cushion member 51, the light unit 18, and the fixing member 50 have been mounted on the bearing-support part 402, the hammer case 4 and at least a portion of the hammer-case cover 5 are sandwiched (enclosed) by the left housing 2L and the right housing 2R. The hook parts 5C are hooked in the respective recessed parts provided on the left housing 2L and the right housing 2R. After the hammer case 4 and at least a portion of the hammer-case cover 5 have been sandwiched by the left housing 2L and the right housing 2R, the left housing 2L and the right housing 2R are fixed to one another by the plurality of screws 2S. In addition, the rear cover 3 is fixed to a rear portion of the motor-housing part 21 by screws 3S.

Operation of Power Tool

Next, the operation of the power tool 1 will be explained. For example, when screw-tightening work is to be performed on a work object (workpiece), the tool accessory (e.g., a screwdriver bit) to be used in the screw-tightening work is inserted into the tool hole 10A of the anvil 10. The tool accessory inserted into the tool hole 10A is held by the bit sleeve 11. After the tool accessory has been mounted in (on) the anvil 10, the user grips the grip part 22 and manipulates (presses, squeezes) the trigger switch 14. When the trigger switch 14 is manipulated, electric power (current) is supplied from the battery pack 25 to the motor 6, the motor 6 is thereby energized, and the lights 60 turn ON at the same time. When the motor 6 is energized, the rotor shaft 33 of the rotor 27 rotates. When the rotor shaft 33 rotates, the rotational force of the rotor shaft 33 is transmitted to the planet gears 42 via the pinion gear 41. Because the planet gears 42 mesh with the radially-inward-facing teeth of the internal gear 43, the planet gears 42 revolve (orbit) around the pinion gear 41 while rotating around the respective pins 42P. As was noted above, the planet gears 42 are supported in a rotatable manner on the spindle 8 via the respective pins 42P. When the planet gears 42 are revolving (orbiting) around the pinion gear 41, the spindle 8 rotates at a rotational speed that is lower than the rotational speed of the rotor shaft 33.

In the state in which the hammer 47 and the anvil-projection part 102 are in contact with one another, when the spindle 8 rotates, the anvil 10 rotates together with the hammer 47 and the spindle 8. Owing to the rotation of the anvil 10, the screw-tightening work progresses.

When a load of a prescribed value or higher acts on the anvil 10 owing to the progression of the screw-tightening work, the rotation of the anvil 10 and the hammer 47 (temporarily) stops. In the state in which the rotation of the hammer 47 is stopped, because the spindle 8 continues to rotate, the hammer 47 moves rearward. Owing to the rearward movement of the hammer 47, contact between the hammer 47 and the anvil-projection part 102 is released. The hammer 47, which has moved rearward, moves forward while rotating owing to the elastic (spring) force of the coil spring 49. When the hammer 47 moves forward while rotating relative to the anvil 10, the anvil 10 is impacted in the rotational direction by the hammer 47. Thereby, the anvil 10 rotates about rotational axis AX with a higher torque. Thus, in this final phase of the screw-tightening work, the anvil 10 is intermittently impacted (struck) by the hammer 47, which causes the anvil 10 to be rotated at a higher torque. Consequently, a screw can be tightened into a work object at a higher torque.

<Effects>

In the first embodiment as explained above, the power tool 1 comprises: the motor 6; the anvil 10, which is an output part that is rotated around rotational axis AX by the motor 6 (e.g., via the speed-reducing mechanism 7, spindle 8, impact mechanism 9, etc.); and the lights 60, which are disposed spaced apart around the anvil 10. The power tool 1 comprises the optical members 80, each of which has the refractive surface 85 that refracts illumination light, which is emitted from the light-emitting surface 61 of the corresponding light 60, radially outward of (away from) rotational axis AX.

In the above-mentioned configuration, illumination light emitted from the lights 60 is refracted by the refractive surfaces 85 of the optical members 80, and thereby advances (propagates) radially outward of (away from) rotational axis AX. Thereby, at the surface of the work object being worked on by the power tool 1, the overlapping range between the illumination light emitted from the first lights 60 and the illumination light emitted from the second lights 60 becomes small. In addition, when the tool accessory is mounted in (on) the anvil 10, the tool accessory tends not to be irradiated with the illumination light emitted from the lights 60, and therefore a shadow of the tool accessory tends not to be formed on (cast onto) the surface of the work object. Thereby, the work object being worked on by the power tool 1 can be suitably illuminated.

Figure 24:
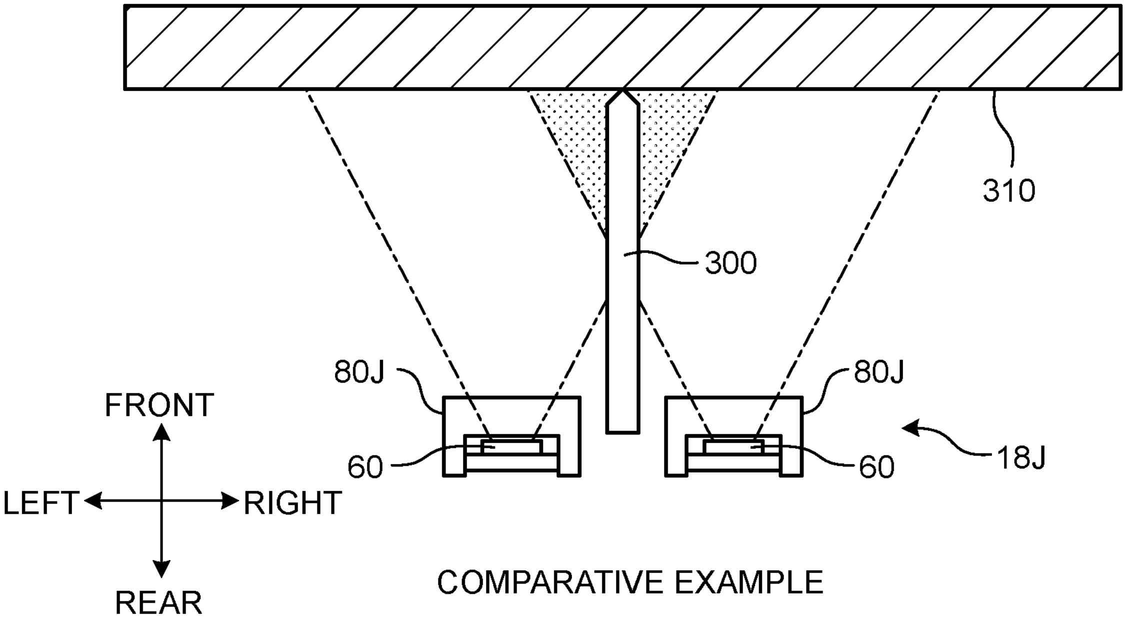
FIG. 24 is a schematic drawing that shows the light unit according to a comparative example.
Figure 25:
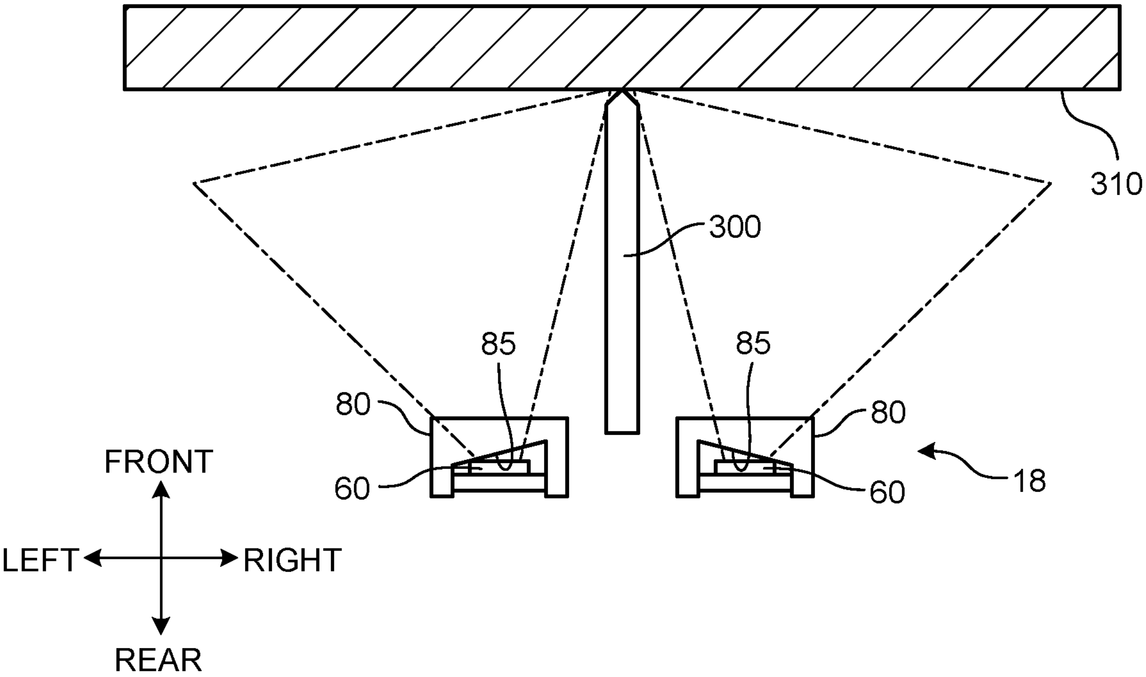
FIG. 25 is a schematic drawing that shows the light unit according to the first embodiment.

The spread of illumination light in the left-right direction will now be explained. FIG. 24 is a schematic drawing that shows a light unit 18J according to a comparative example. FIG. 25 is a schematic drawing that shows the light unit 18 according to the first embodiment of the present disclosure. FIG. 24 and FIG. 25 each show the spread of illumination light in the left-right direction.

The hypothetical tool accessory 300 is a so-called driver bit (screwdriver bit), and the work object 310 is a wood material. A screw to be tightened is held by a tip portion of the driver bit so that the screw and the driver bit rotate together. The length of the hypothetical driver bit, which is most used in the technical field pertaining to the power tool 1, is approximately 65 mm. Consequently, here, screw-tightening work that uses a driver bit having a length of approximately 65 mm is assumed. Because a rear portion of the driver bit overlaps the anvil 10, the driver bit protrudes approximately 40 mm from a front-end portion of the anvil 10. It is noted that FIG. 24 and FIG. 25 each show the state in which the screw-tightening work has been completed, and the location of the front-end portion (tip) of the tool accessory 300 and the location of the surface of the work object 310 are substantially the same.

As shown in FIG. 24, the light unit 18J according to the comparative example comprises the lights 60 and optical members 80J. The optical members 80J do not have refractive power. If the lights 60 are disposed on the left side and the right side of the tool accessory 300, the overlapping range between illumination light emitted from the first (left) lights 60 and illumination light emitted from the second (right) lights 60 is relatively large at the surface of the work object 310 as shown by the shaded portion surrounding the tip portion of the driver bit in FIG. 24. In addition, when the tool accessory 300 is mounted in (on) the anvil 10, some of the illumination light emitted from the lights 60 will be irradiated toward the tool accessory 300, thereby causing a shadow of the tool accessory 300 to be formed on the surface of the work object 310. When a shadow of the tool accessory 300 is formed on the surface of the work object 310, it may become difficult for the user to clearly see the position on the work object where the screw is to be fastened (i.e. the area of the work object where a shadow of the driver bit is cast), and therefore there is a possibility that work efficiency will decrease.

As shown in FIG. 25, the light unit 18 according to the first embodiment comprises the lights 60 and the optical members 80. Each of the optical members 80 has the refractive surface 85, which refracts illumination light emitted from the corresponding light 60 radially outward. FIG. 25 shows an example in which illumination light emitted from the left-side light 60 is refracted in the left direction, and illumination light emitted from the right-side light 60 is refracted in the right direction. When the lights 60 are disposed on the left side and the right side of the tool accessory 300, the overlapping range between illumination light emitted from the first lights 60 and illumination light emitted from the second lights 60 becomes relatively small (or even there is no overlapping range) at (on) the surface of the work object 310 being worked on by the power tool 1. In addition, when the tool accessory 300 is mounted on the anvil 10, the tool accessory 300 tends not to be irradiated with illumination light emitted from the lights 60, and therefore a shadow of the tool accessory 300 is less likely to form on the surface of the work object 310. Thereby, a decrease in work efficiency owing to insufficient illumination can be avoided. It is noted that FIG. 25 shows an example in which the angle of refraction of the refractive surfaces 85 is optimized such that, when a driver bit having a length of approximately 65 mm is used, a shadow of the driver bit is not formed on the surface of the work object 310.

It is noted that the length of the driver bit is not limited to 65 mm. Driver bits of various lengths other than 65 mm are commercially available. In addition, screws of various lengths are commercially available. Illustrative examples of screw lengths include 120 mm, 90 mm, 75 mm, and the like. In accordance with the length of the driver bit assumed to be used, the angle of refraction of the refractive surfaces 85 may be optimized such that a shadow of the driver bit is not formed on the surface of the work object 310.

Figure 26:
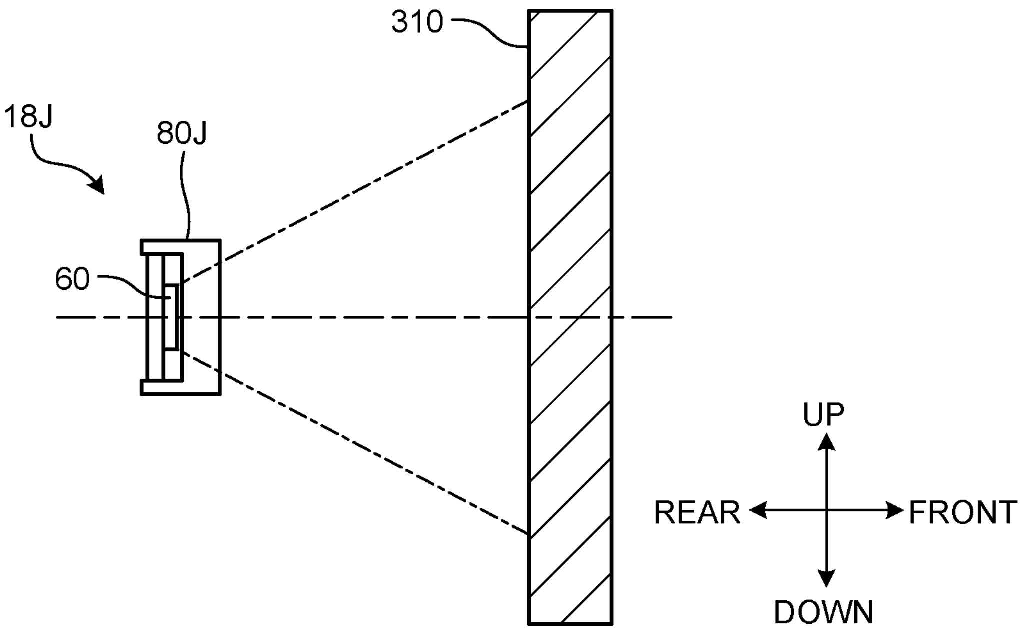
FIG. 26 is a schematic drawing that shows the light unit according to the comparative example.
Figure 27:
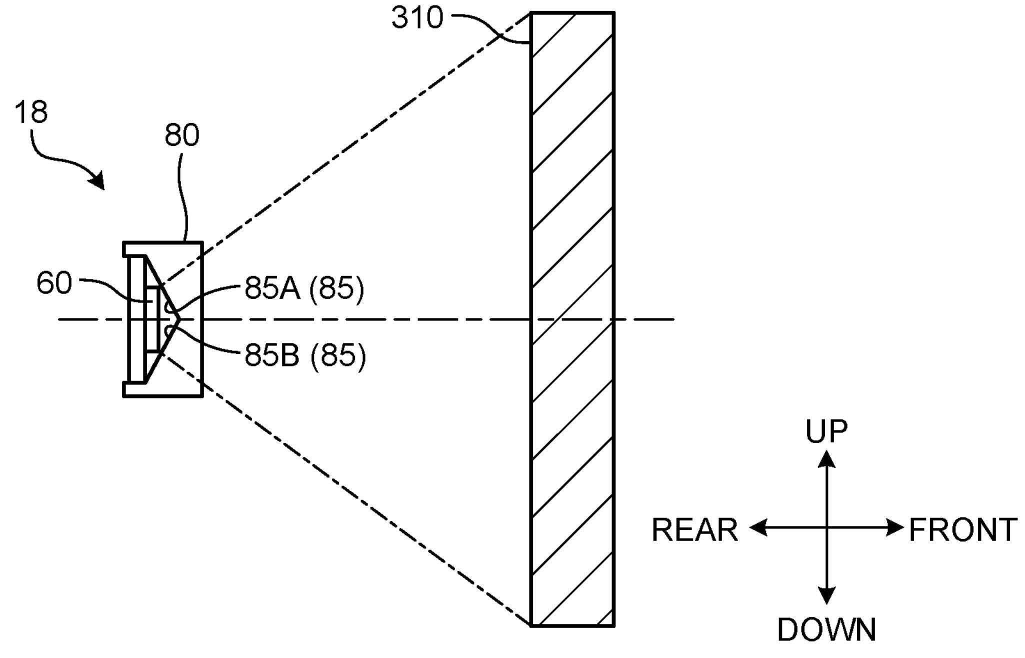
FIG. 27 is a schematic drawing that shows the light unit according to the first embodiment.

Next, the spread of illumination light in the up-down direction (circumferential direction) will be explained. FIG. 26 is a schematic drawing that shows the light unit 18J according to a comparative example. FIG. 27 is a schematic drawing that shows the light unit 18 according to the first embodiment of the present disclosure. FIG. 26 and FIG. 27 each show the spread of illumination light in the up-down direction (circumferential direction).

As shown in FIG. 26, the optical member 80J according to the comparative example does not have refractive power. Consequently, with regard to the light unit 18J according to the comparative example, the range over which the illumination light spreads in the up-down direction (circumferential direction) is relatively small.

On the other hand, as shown in FIG. 27, the optical member 80J according to the embodiment has the refractive surfaces 85. As explained with reference to FIG. 20, the refractive surfaces 85 include: the first refractive surface 85A, which refracts illumination light emitted from the corresponding light 60 radially outward (away from rotational axis AX) and toward the one side in the circumferential direction; and the second refractive surface 85B, which refracts illumination light emitted from the corresponding light 60 radially outward (away from rotational axis AX) and toward the other side in the circumferential direction. Consequently, with regard to the light unit 18 according to the embodiment, the range over which illumination light spreads in the up-down direction (circumferential direction) becomes larger.

Figure 28:
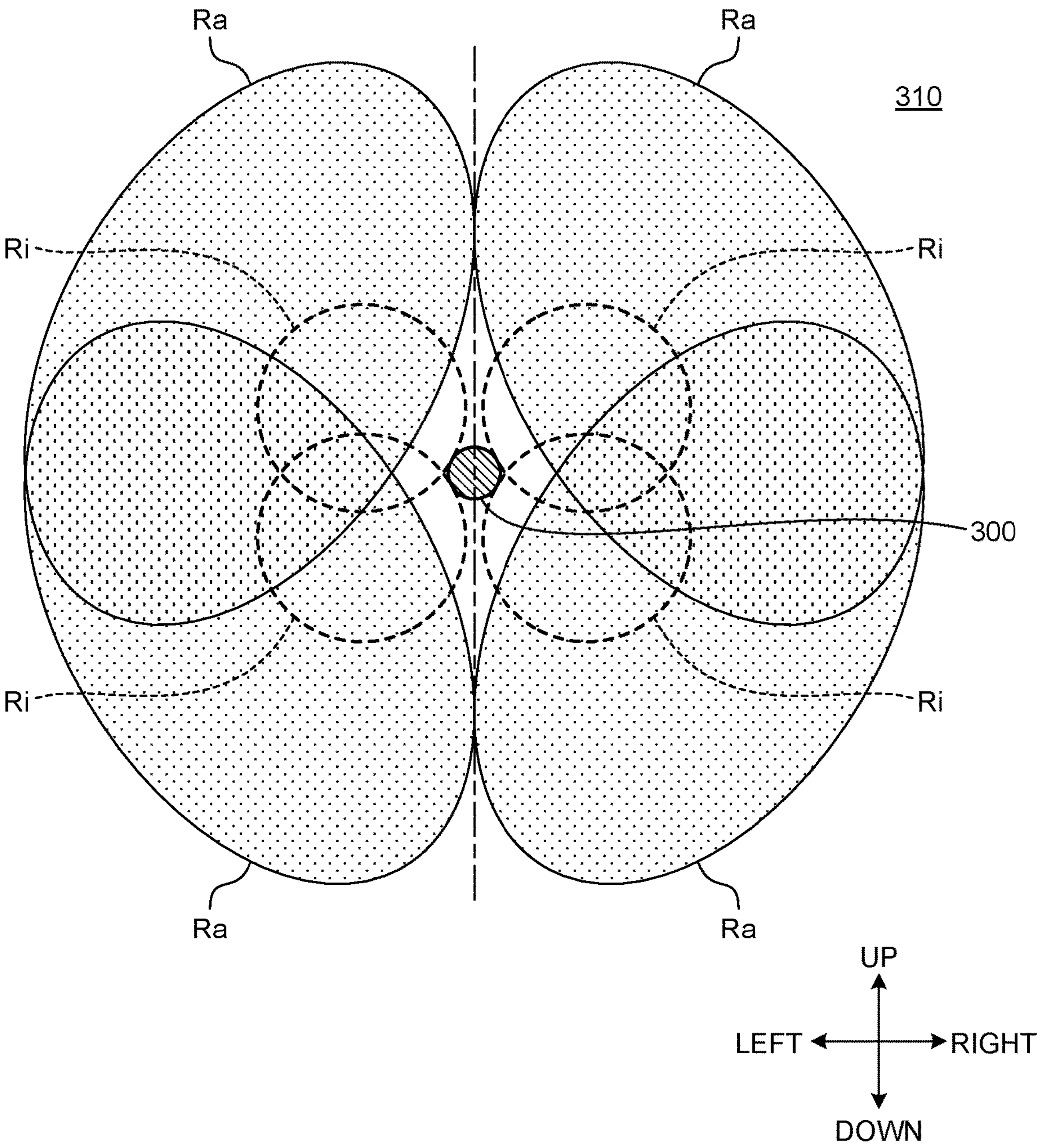
FIG. 28 is a schematic drawing that shows illumination ranges of illumination light according to the first embodiment.

FIG. 28 is a schematic drawing that shows the illumination ranges of the illumination light according to the first embodiment. With regard to the optical members 80 according to the first embodiment of the present disclosure, illumination light emitted from the lights 60 refracts radially outward (away from rotational axis AX) and spreads in the circumferential direction. Consequently, as shown in FIG. 28, illumination ranges Ra of illumination light at the surface of the work object 310 become elliptical. Because four of the lights 60 are utilized in the first embodiment, four of the elliptical-shaped illumination ranges Ra are formed around the tool accessory 300. Illumination ranges Ri according to the comparative example are smaller than illumination ranges Ra.

In the first embodiment, each of the optical members 80 has the incident surface 83, on which the illumination light emitted from the corresponding light 60 impinges, and the emergent surface 84, from which the illumination light emerges. Each of the incident surfaces 83 includes the corresponding refractive surface 85.

In the above-mentioned configuration, the incident surfaces 83, which include the refractive surfaces 85, are not exposed on the exterior of the power tool 1. Accordingly, the likelihood of damage to the refractive surfaces 85 can be reduced.

In the first embodiment, the incident surfaces 83 respectively oppose (face) the light-emitting surfaces 61.

In the above-mentioned configuration, because a separate optical member is not disposed between the light-emitting surfaces 61 of the lights 60 and the incident surfaces 83 of the optical members 80, an increase in size and complexity of the structure of the optical system through which the illumination light emitted from the lights 60 passes can be avoided.

In the first embodiment, each of the refractive surfaces 85 is tilted such that it approaches the corresponding light 60 as the refractive surface 85 extends radially outward (away from rotational axis AX).

In the above-mentioned configuration, the illumination light emitted from the light-emitting surfaces 61 of the lights 60 can be refracted radially outward of (away from) rotational axis AX at (by) the refractive surfaces 85.

In the first embodiment, each of the refractive surfaces 85 includes the first refractive surface 85A, which refracts illumination light in first direction D1, and the second refractive surface 85B, which refracts illumination light in second direction D2.

In the above-mentioned configuration, because the illumination light emitted from the light-emitting surfaces 61 of the lights 60 is refracted in a plurality of directions (i.e. different directions), the illumination range of the illumination light at (on) the surface of the work object 310 being worked on by the power tool 1 is enlarged.

In the first embodiment, the power tool 1 comprises the circuit board 70, which has the support surface 71 that supports the lights 60.

In the above-mentioned configuration, in the state in which the lights 60 are supported by the support surface 71 of the circuit board 70, the lights 60 can emit illumination light.

In the first embodiment, rotational axis AX and the normal lines of the respective light-emitting surfaces 61 are parallel to one another.

In the above-mentioned configuration, after the illumination light emitted from the light-emitting surfaces 61 of the lights 60 has advanced (propagated) parallel to rotational axis AX, it can be refracted radially outward of (away from) rotational axis AX by the respective optical members 80.

In the first embodiment, the optical members 80 are fixed to the circuit board 70.

In the above-mentioned configuration, because the optical members 80 are fixed to the circuit board 70, the relative positions of the lights 60, the optical members 80, and the circuit board 70 do not change during operation of the power tool 1.

In the first embodiment, the power tool 1 comprises the cover member 90, which is disposed more forward than at least a portion of the circuit board 70, is formed of a material that differs from the material of the optical members 80, and is formed integrally with the optical members 80.

In the above-mentioned configuration, the circuit board 70 is protected by the cover member 90. By protecting the circuit board 70, the lights 60 can operate properly. Accordingly, the work object 310 being worked on by the power tool 1 can be suitably illuminated.

In the first embodiment, the optical members 80 and the cover member 90 are fixed to the circuit board 70.

In the above-mentioned configuration, because the optical members 80 and the cover member 90 are each fixed to the circuit board 70, the relative positions of the lights 60, the optical members 80, and the circuit board 70 do not change during operation of the power tool 1.

In the first embodiment, the power tool 1 comprises: the speed-reducing mechanism 7 and the spindle 8, which transmit the rotational force of the motor 6 to the anvil 10; and the hammer case 4, which houses the spindle 8 and at least a portion of the anvil 10. The optical members 80 and the cover member 90 are supported by the hammer case 4.

In the above-mentioned configuration, the relative positions of the optical members 80 and the cover member 90 on one side and the hammer case 4 on the other side do not change during operation of the power tool 1.

In the first embodiment, the hammer case 4 comprises: the hammer-housing part 401, which is disposed around the spindle 8 and the impact mechanism 9; and the bearing-support part 402, which is disposed more forward than the hammer-housing part 401 and whose outer diameter is smaller than the outer diameter of the hammer-housing part 401. The optical members 80 and the cover member 90 are disposed around the bearing-support part 402.

In the above-mentioned configuration, because the optical members 80 and the cover member 90 are disposed around the bearing-support part 402, which has a small diameter, it is not necessary to enlarge the power tool 1 to utilize the present teachings. In particular, enlargement (increase in the diameter) of the hammer-housing part 401 can be avoided. Because the hammer-housing part 401 need not be enlarged (increased in the diameter), work efficiency using the power tool 1 can be increased.

In the embodiment, the bearing-support part 402 comprises the angled parts 403, which protrude radially outward; furthermore, the optical members 80 have the recessed parts 82C, in which the angled parts 403 are respectively disposed, and the cover member 90 has the recessed parts 93C, in which the angled parts 403 are respectively disposed.

In the above-mentioned configuration, the optical members 80 and the cover member 90 on one side and the bearing-support part 402 on the other side can be properly aligned with one another. In addition, relative rotation between the optical members 80 and the cover member 90 on one side and the bearing-support part 402 on the other side is restricted (blocked).

In the first embodiment, the power tool 1 comprises the fixing member 50, which is supported by the bearing-support part 402 and makes contact with at least a portion of the front surface of the cover member 90.

With the above-mentioned configuration, the fixing member 50 blocks (prevents) the cover member 90 from coming off of the bearing-support part 402 in the forward direction. In addition, relative movement between the cover member 90 and the bearing-support part 402 in the front-rear direction is restricted (blocked).

Second Embodiment

A second embodiment will now be explained. In the explanation below, structural elements that are the same as or equivalent to those in the first embodiment described above are assigned the same symbols, and explanations of those structural elements are simplified or omitted.

Figure 29:
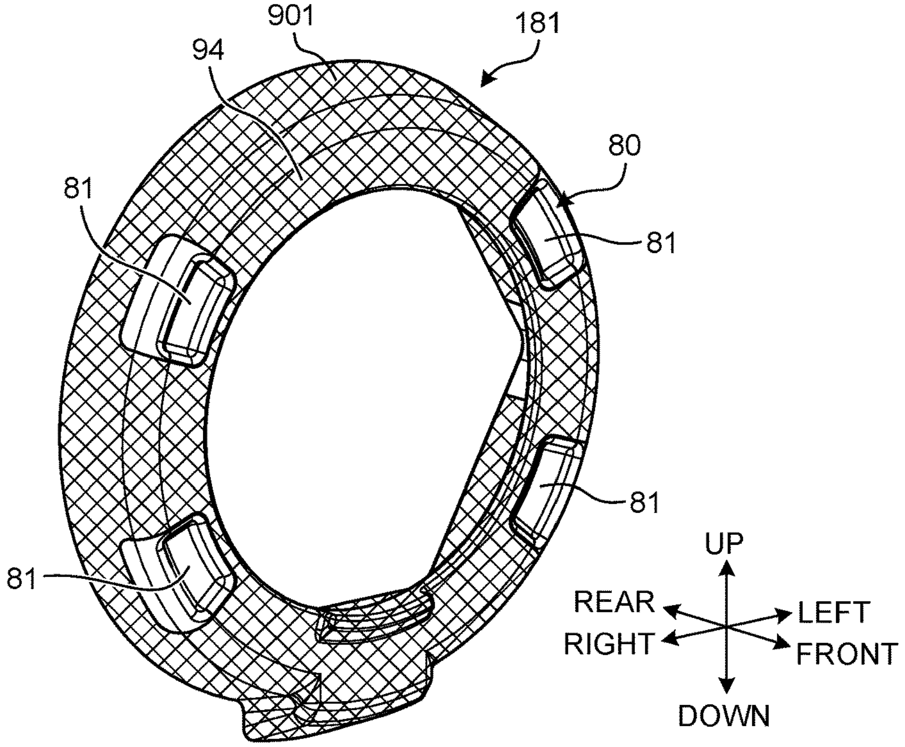
FIG. 29 is an oblique view that shows the light unit according to a second embodiment of the present teachings.

FIG. 29 is an oblique view that shows a light unit 181 according to the second embodiment. The light unit 181 comprises the optical members 80 and a cover member 901. The optical members 80 and the cover member 901 are formed integrally.

In the second embodiment, the cover member 901 is formed of a material that differs from the material of the optical members 80. Each of the optical members 80 comprises the optically transmissive part 81, which transmits the illumination light emitted from the light-emitting surface 61 of the corresponding light 60. The cover member 901 comprises a light-shielding part (light-blocking part or opaque part) 94. The cover member 901 is formed of a synthetic resin (polymer) in which a coloring material (pigment, dye, etc.) is dispersed. In one example of the second embodiment, the optical members 80 are formed of a polycarbonate. The cover member 901 is formed of a polycarbonate or from an acrylic resin (e.g., a polyacrylate, such as poly(methyl methacrylate)) in which, e.g., a white pigment is dispersed. It is noted, however, that the pigment that is dispersed in the polycarbonate or the acrylic resin does not have to be a white pigment and may be, for example, a black pigment. The light-shielding part 94 is formed by imparting coloring (opaqueness) to the cover member 901.

Because the circuit board 70 is not visible from outside of the cover member 901 owing to the light-shielding part 94, the aesthetics of the power tool 1 are improved. In addition, irradiation of external light onto the circuit board 70 is blocked.

In the second embodiment as explained above, the cover member 901 is formed of a material that differs from the material of the optical members 80. The cover member 901 is formed integrally with the optical members 80.

In the above-mentioned configuration, the lights 60 are protected by the optical members 80, and the circuit board 70 is protected by the cover member 901. By protecting the lights 60, the likelihood of damage to the lights 60 can be reduced. By protecting the circuit board 70, the lights 60 can operate properly. Because the cover member 901 is formed of a material that differs from that of the optical members 80, the circuit board 70 is suitably protected. In addition, because the optical members 80 and the cover member 901 are formed integrally, the relative positions of the optical members 80 and the cover member 901 do not change during operation of the power tool 1. Accordingly, the work object 310 being worked on by the power tool 1 is suitably illuminated.

In the second embodiment, each of the optical members 80 comprises the optically transmissive part 81, which transmits the illumination light emitted from the corresponding light-emitting surface 61. The cover member 901 comprises the light-shielding part 94.

In the above-mentioned configuration, illumination light emitted from the light-emitting surfaces 61 of the lights 60 is transmitted through the optically transmissive parts 81 and is irradiated onto the work object 310 being worked on by the power tool 1. Because the circuit board 70 is not visible from outside of the cover member 901 owing to the light-shielding part 94, the aesthetics of the power tool 1 are improved. In addition, irradiation of external light onto the circuit board 70 is curtailed.

In the second embodiment, the optical members 80 are formed of a synthetic resin (polymer). The cover member 901 is formed of a synthetic resin (polymer) in which a coloring material is dispersed.

In the above-mentioned configuration, the optical members 80 are formed of a synthetic resin (polymer) that is optically transmissive. The cover member 901 is formed by dispersing coloring material in the synthetic resin that constitutes the optical members 80 to make the cover member 901 opaque.

Third Embodiment

A third embodiment will now be explained. In the explanation below, structural elements that are the same as or equivalent to those of the first or second embodiments described above are assigned the same symbols, and explanations of those structural elements are simplified or omitted.

Figure 30:
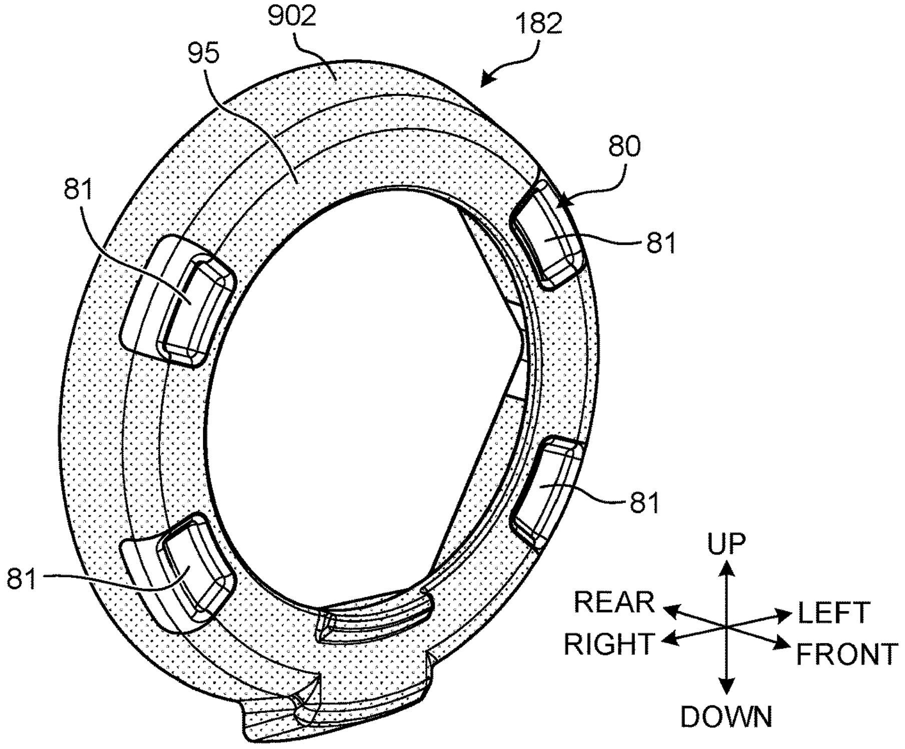
FIG. 30 is an oblique view that shows the light unit according to a third embodiment of the present teachings.

FIG. 30 is an oblique view that shows a light unit 182 according to the third embodiment. The light unit 182 comprises the optical members 80 and a cover member 902. The optical members 80 and the cover member 902 are formed integrally.

In the third embodiment, the cover member 902 may be formed of a material that differs from the material of the optical members 80 or may be formed of a material that is the same as that of the optical members 80. Each of the optical members 80 comprises the optically transmissive part 81, which transmits the illumination light emitted from the light-emitting surface 61 of the corresponding light 60. The cover member 902 comprises a light-shielding part 95. The cover member 902 is formed of a synthetic resin (polymer). In one example of the third embodiment, the optical members 80 are formed of a polycarbonate. The cover member 902 is formed of a polycarbonate resin or from an acrylic resin (e.g., a polyacrylate, such as poly (methyl methacrylate)). The surface of the cover member 902 may be given, for example, a textured finish. A fine unevenness (bumps) is formed on the surface of the cover member 902. By forming the fine unevenness on the surface of the cover member 902, the light-shielding part 95 is formed.

Because the circuit board 70 is not visible from outside of the cover member 902 owing to the light-shielding part 95, the aesthetics of the power tool 1 are improved. In addition, irradiation of external light onto the circuit board 70 can be blocked.

Fourth Embodiment

A fourth embodiment will now be explained. In the explanation below, structural elements that are the same as or equivalent to those of the first, second or third embodiments described above are assigned the same symbols, and explanations of those structural elements are simplified or omitted.

Figure 31:
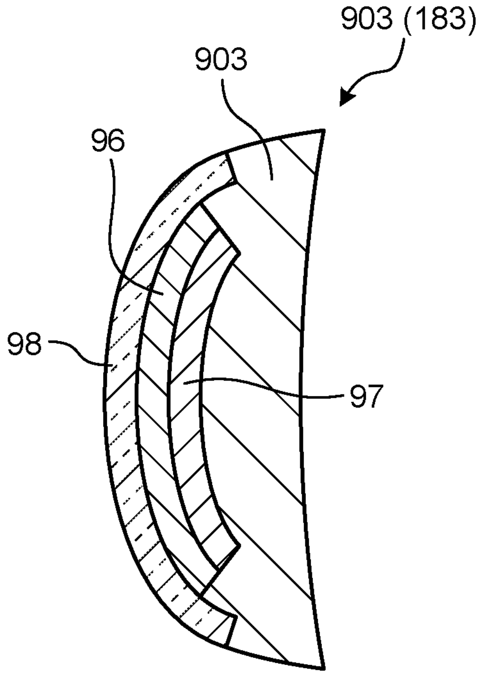
FIG. 31 is a cross-sectional view that schematically shows the light unit according to a fourth embodiment of the present teachings.

FIG. 31 is a cross-sectional view that schematically shows a light unit 183 according to the fourth embodiment. As in the first, second and third embodiments described above, the light unit 183 comprises: the lights 60; the circuit board 70, which supports the lights 60; and the optical members 80. In FIG. 31, the lights 60, the circuit boards 70, and the optical members 80 are omitted.

In the fourth embodiment, a cover member 903 of the light unit 183 is formed of the same material as that of the optical members 80. The cover member 903 is formed integrally with the optical members 80.

The light unit 183 has a colored layer 96, which is provided on at least one of a rear surface of the cover member 903 and a front surface of the cover member 903. In the example shown in FIG. 31, the colored layer 96 is provided on the front surface of the cover member 903. It is noted that the colored layer 96 may instead be provided on the rear surface of the cover member 903 or may be provided on both the front surface and the rear surface of the cover member 903.

In addition, the light unit 183 comprises a bonding layer 97, which is disposed between the cover member 903 and the colored layer 96, and a protective layer 98, which covers the colored layer 96. The colored layer 96 is provided on the front surface of the cover member 903 via the bonding layer 97. The protective layer 98 is a transparent film or layer made of a synthetic resin (polymer).

Figure 32:
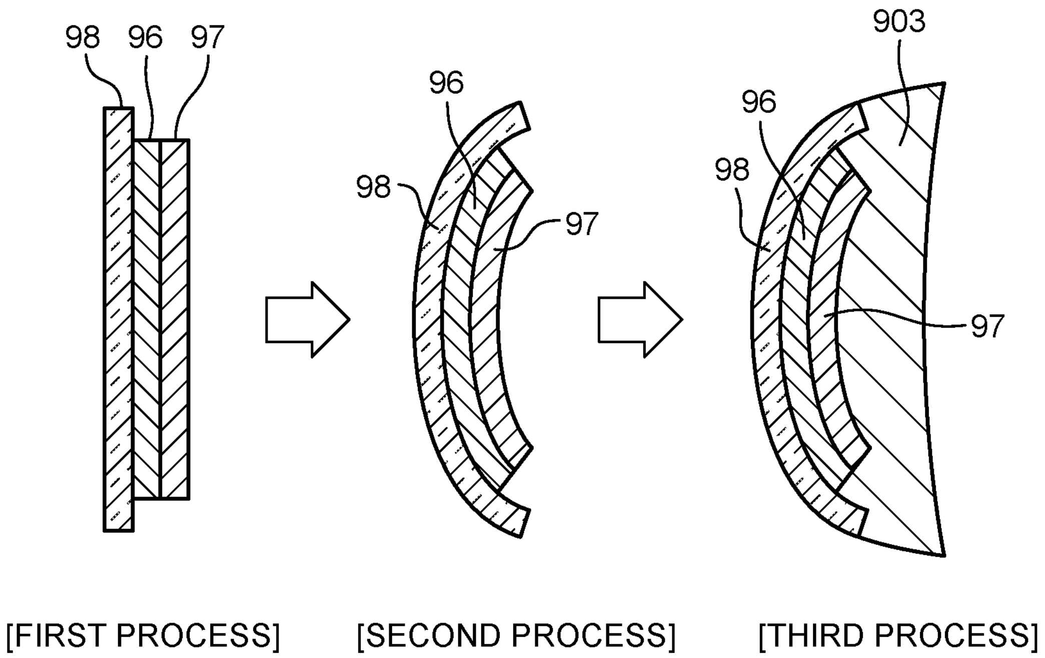
FIG. 32 is a drawing that schematically shows a method of manufacturing the cover member according to the fourth embodiment.

FIG. 32 is a drawing that schematically shows a method of manufacturing the cover member 903 according to the fourth embodiment. In a first manufacturing process, the colored layer 96 is formed on the protective layer 98, which is a transparent film. The colored layer 96 is formed on the surface of the protective layer 98 by, for example, a screen-printing method. After the colored layer 96 has been formed on the protective layer 98, the bonding layer 97 is formed on the colored layer 96. The bonding layer 97 is formed on the surface of the colored layer 96 by, for example, a screen-printing method. After the colored layer 96 and the bonding layer 97 have been formed on the protective layer 98, in a second manufacturing process, the protective layer 98 is formed so as to conform to the shape of the front surface of the cover member 903. By forming the protective layer 98, the colored layer 96 and the bonding layer 97 are also formed. After the protective layer 98 has been formed, in a third manufacturing process, the colored layer 96 and the protective layer 98 are bonded to the front surface of the cover member 903 via the bonding layer 97. Thereby, the cover member 903, which has the colored layer 96, is formed.

In the fourth embodiment as explained above, the cover member 903 is formed of a material the same as that of the optical members 80. The cover member 903 is formed integrally with the optical members 80. The power tool 1 comprises the colored layer 96, which is provided on at least one of the rear surface of the cover member 903 and the front surface of the cover member 903.

In the above-mentioned configuration, the lights 60 are protected by the optical members 80, and the circuit board 70 is protected by the cover member 903. By protecting the lights 60, the likelihood of damage to the lights 60 can be reduced. By protecting the circuit board 70, the lights 60 can operate properly. In addition, because the optical members 80 and the cover member 903 are formed integrally, the relative positions of the optical members 80 and the cover member 903 do not change during operation of the power tool 1. Accordingly, the work object 310 being worked on by the power tool 1 is suitably illuminated. In addition, because the circuit board 70 is not visible from outside of the cover member 903 owing to the colored layer 96, which is provided on at least one of the rear surface of the cover member 903 and the front surface of the cover member 903, the aesthetics of the power tool 1 are improved. In addition, irradiation of external light onto the circuit board 70 is blocked.

In the fourth embodiment, the power tool 1 comprises the bonding layer 97, which is disposed between the cover member 903 and the colored layer 96.

In the above-mentioned configuration, the cover member 903 and the colored layer 96 are fixed to one another via the bonding layer 97.

In the fourth embodiment, the power tool 1 comprises the protective layer 98, which covers the colored layer 96.

In the above-mentioned configuration, the colored layer 96 is protected by the protective layer 98. Owing to the protective layer 98, for example, the colored layer 96 is less likely to peel off from the cover member 903.

Other Embodiments

In the embodiments described above, it is assumed that each of the lights 60 comprises a chip LED (or LED chip) and is mounted on the support surface 71 of the circuit board 70. That is, it is assumed that the light unit (18, etc.) has a surface-mount-type (SMD: surface-mount device) LED. The light unit may comprise a chip-on-board-type (COB: chip on board) LED. The light unit may comprise a bullet-type LED. In addition, the circuit board 70 may be omitted.

In the embodiments described above, it is assumed that the lights 60 comprise: the plurality of left lights 601, which is provided on the left side of rotational axis AX; and the plurality of right lights 602, which is provided on the right side of rotational axis AX in a quantity the same as that of the left lights 601. A plurality of the lights 60 may be provided around rotational axis AX. For example, the lights 60 may be disposed upward of rotational axis AX.

In the embodiments described above, it is assumed that the power tool 1 is an impact driver. The power tool 1 may be, e.g., an impact wrench or another type of similar power tool.

In the embodiments described above, the power supply of the power tool 1 may be a commercial power supply (AC power supply) instead of the battery pack 25.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as power tools and other electric devices that utilize an electric motor as its drive source.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Power tool
2 Housing
2L Left housing
2R Right housing
2S Screw
3 Rear cover
3S Screw
4 Hammer case (case)
4A Protruding part
5 Hammer-case cover
5A Cover part
5B Ring part
5C Hook part
5D Opening
5E Recessed part
5F Notch
5H Front-end part
6 Motor
7 Speed-reducing mechanism (transmission mechanism)
8 Spindle (transmission mechanism)
8A Flange part
8B Spindle-shaft part
8C Circumferential-wall part
8D Spindle groove
9 Impact mechanism (transmission mechanism)
10 Anvil (output part)
10A Tool hole
10B Spindle-protrusion part
11 Bit sleeve
12 Fan
12A Bushing
13 Battery-mounting part
14 Trigger switch
15 Forward/reverse changing lever
16 Operation panel
16A Impact-force switch
16B Special-purpose switch
17 Accessible mode-changing button
18 Light unit
19 Air-suction port
20 Air-exhaust port
21 Motor-housing part
22 Grip part
23 Battery-connect part
24 Bearing box
24A Recessed part
24B Recessed part
25 Battery pack
26 Stator
27 Rotor
28 Stator core
29 Front insulator
29S Screw
30 Rear insulator
31 Coil
32 Rotor core
33 Rotor shaft
34 Rotor magnet
35 Sensor magnet
37 Sensor board
38 Fusing terminal
39 Rotor bearing
39F Front-side rotor bearing
39R Rear-side rotor bearing
41 Pinion gear
42 Planet gear
42P Pin
43 Internal gear
44 Spindle bearing
45 Washer
46 Bearing
47 Hammer
47A Hole
47B Hammer groove
47C Recessed part
48 Ball
49 Coil spring
50 Fixing member
51 Cushion member
51C Recessed part
52 Support groove
55 Bonding-resin part
60 Light
61 Light-emitting surface
70 Circuit board
71 Support surface
72 Lead wire
73 Notch (Gap, Opening)
70C Recessed part
80 Optical member
80L Optical member
80R Optical member
81 Optically transmissive part
82 Coupling part
82C Recessed part
83 Incident surface
84 Emergent surface
85 Refractive surface
85A First refractive surface
85B Second refractive surface
86 Recessed part
87 Circumferential-wall part
90 Cover member
90A Front-side support part
90B Rear-side support part
90C Engaging part
90D Latching part 90E Inner-circumference wall part
90F Outer-circumference wall part
90 G Front-wall part
90H Hollow part
91 Opening
92 Groove
93 Housing part
93C Recessed part
94 Light-shielding part
95 Light-shielding part
96 Colored layer
97 Bonding layer
98 Protective layer
101 Anvil body
102 Anvil-projection part
181 Light unit
182 Light unit
183 Light unit
200 Recessed part
300 Tool accessory
310 Work object
401 Hammer-housing part (first tube part)
402 Bearing-support part (second tube part)
402A Recessed part
403 Angled part
404 Rotation-stop part
405 Tip part
601 Left light
601A Left light
601B Left light
602 Right light
602A Right light
602B Right light
901 Cover member
902 Cover member
903 Cover member
AX Rotational axis
Ra Illumination range

I claim:

1. A power tool comprising:
a motor;
an output part configured to be rotated about a rotational axis in response to energization the motor;
lights disposed spaced apart around the output part;
a circuit board having a support surface that supports the lights;
an optical member disposed such that the optical member opposes a light-emitting surface of one of the lights; and
a cover member, which has at least a portion that is disposed more forward than the circuit board, is formed of a material that differs from the material of the optical member, and is formed integrally with the optical member.

2. The power tool according to claim 1, wherein the optical member and the cover member are fixed to the circuit board.

3. The power tool according to claim 1, wherein:
the optical member includes an optically transmissive part, which transmits illumination light emitted from the light-emitting surface; and
the cover member comprises a light-shielding part.

4. The power tool according to claim 1, wherein:
the optical member is formed of a polymer; and
the cover member is formed of a polymer in which a coloring material is dispersed.

5. The power tool according to claim 1, wherein the optical member is insert-molded to the cover member.

6. A power tool comprising:
a motor;
an output part configured to be rotated about a rotational axis in response to energization of the motor;
lights disposed spaced apart around the output part;
a circuit board having a support surface that supports the lights;
an optical member disposed such that the optical member opposes a light-emitting surface of one of the lights;
a cover member, which has at least a portion that is disposed more forward than the support surface of the circuit board, is formed of a material the same as the material of the optical member, and is formed integrally with the optical member; and
a colored layer provided on at least one of a rear surface of the cover member or on a front surface of the cover member.

7. The power tool according to claim 6, further comprising a bonding layer disposed between the cover member and the colored layer.

8. The power tool according to claim 6, further comprising a protective layer, which covers the colored layer.

9. The power tool according to claim 6, further comprising:
a transmission mechanism configured to transmit rotational force of the motor to the output part; and
a case, which houses the transmission mechanism and at least a portion of the output part;
wherein the optical member and the cover member are supported by the case.

10. The power tool according to claim 9, wherein:
the case includes a first tube part disposed around the transmission mechanism, and a second tube part disposed more forward than the first tube part;
the second tube part has an outer diameter that is smaller than the outer diameter of the first tube part; and
the optical member and the cover member are disposed around the second tube part.

11. The power tool according to claim 10, wherein:
the second tube part has angled parts, which protrude radially outward; and
the optical member and the cover member have recessed parts, in which the angled parts are disposed.

12. The power tool according to claim 10, further comprising a fixing member, which is supported by the second tube part and makes contact with at least a portion of the front surface of the cover member.

13. A power tool comprising:
a motor;
an output part configured to be rotated about a rotational axis in response to energization of the motor;
lights disposed spaced apart around the output part; and
an optical member having a refractive surface configured to refract illumination light emitted from a light-emitting surface of one of the lights such that a main illuminating direction of the illumination light is at an angle away from the rotational axis.

14. The power tool according to claim 13, wherein the optical member includes an incident surface on which the illumination light impinges, an emergent surface from which the illumination light emerges and a circumferential wall part protruding from the emergent surface and surrounding a portion of the emergent surface from which the illumination light that emerges.

15. The power tool according to claim 13, including:

a hammer case housing at least a portion of the output part; and a hammer case cover covering at least a portion of the hammer case;

wherein the lights are disposed forward of the hammer case.

16. The power tool according to claim 13, wherein:

the optical member has an incident surface, on which illumination light emitted from the light impinges, and an emergent surface, from which the illumination light emerges; and the incident surface includes the refractive surface.

17. The power tool according to claim 16, wherein the incident surface opposes the light- emitting surface.

18. The power tool according to claim 13, wherein the refractive surface is tilted such that the refractive surface is closer to said one of the lights at a first location of the refractive surface that is radially outward of a second location of the refractive surface that is radially inward.

19. The power tool according to claim 18, wherein the refractive surface includes a first refractive surface, which refracts illumination light in a first direction, and a second refractive surface, which refracts illumination light in a second direction.

20. The power tool according to claim 13, further comprising a circuit board having a support surface that supports the lights.

21. The power tool according to claim 20, wherein the rotational axis and a line normal to the light-emitting surface are parallel to one another.

22. The power tool according to claim 20, wherein the optical member is fixed to the circuit board.

23. The power tool according to claim 20, further comprising a cover member, which has at least a portion that is disposed more forward than the circuit board, is formed of a material that differs from the material of the optical member, and is formed integrally with the optical member.

* * * * *